(12) United States Patent
Won et al.

(10) Patent No.: US 11,737,632 B2
(45) Date of Patent: Aug. 29, 2023

(54) MODULAR ROBOT

(71) Applicant: iRobot Corporation, Bedford, MA (US)

(72) Inventors: Chikyung Won, Tewksbury, MA (US); Scott Thomas Burnett, Windham, NH (US); Stephen A. Hickey, Somerville, MA (US); Deepak Ramesh Kapoor, Cupertino, CA (US); Zivthan A. Dubrovsky, Waltham, MA (US); Selma Svendsen, Andover, MA (US); Robert Rizzari, Billerica, MA (US); Paul E. Sandin, Brookline, NH (US)

(73) Assignee: iRobot Corporation, Bedford, MA (US)

(*) Notice: Subject to any disclaimer, the term of this patent is extended or adjusted under 35 U.S.C. 154(b) by 881 days.

(21) Appl. No.: 16/718,450

(22) Filed: Dec. 18, 2019

(65) Prior Publication Data

US 2020/0121152 A1    Apr. 23, 2020

Related U.S. Application Data

(63) Continuation of application No. 14/461,733, filed on Aug. 18, 2014, now Pat. No. 10,524,629, which is a
(Continued)

(51) Int. Cl.
*A47L 11/24* (2006.01)
*B25J 9/00* (2006.01)
(Continued)

(52) U.S. Cl.
CPC ............. *A47L 11/4011* (2013.01); *A47L 5/30* (2013.01); *A47L 9/009* (2013.01); *A47L 9/0411* (2013.01);
(Continued)

(58) Field of Classification Search
CPC ........ A47L 11/4011; A47L 5/30; A47L 9/009; A47L 9/0411; A47L 9/0466;
(Continued)

(56) References Cited

U.S. PATENT DOCUMENTS

| 4,306,329 A | 12/1981 | Yokoi |
| 4,962,453 A | 10/1990 | Pong et al. |

(Continued)

FOREIGN PATENT DOCUMENTS

| EP | 437024 | 7/1991 |
| EP | 748006 | 12/1996 |

(Continued)

OTHER PUBLICATIONS (No Author Listed), "Electrolux Caster Wheel," eVacuumstore.com, 2020, retrieved from URL: https://evacuumstore.com/p-335-electrolux-caster-wheel.aspx, retrieved on Sep. 23, 2020, 8 pages (Exhibit No. 1020 in IPR2020-01641).
(Continued)

*Primary Examiner* — David Redding
(74) *Attorney, Agent, or Firm* — Fish & Richardson P.C.

(57) ABSTRACT

A coverage robot including a chassis, multiple drive wheel assemblies disposed on the chassis, and a cleaning assembly carried by the chassis. Each drive wheel assembly including a drive wheel assembly housing, a wheel rotatably coupled to the housing, and a wheel drive motor carried by the drive wheel assembly housing and operable to drive the wheel. The cleaning assembly including a cleaning assembly housing, a cleaning head rotatably coupled to the cleaning assembly housing, and a cleaning drive motor carried by cleaning assembly housing and operable to drive the cleaning head. The wheel assemblies and the cleaning assembly are each separately and independently removable from respective receptacles of the chassis as complete units.

20 Claims, 23 Drawing Sheets

Related U.S. Application Data continuation of application No. 14/037,008, filed on Sep. 25, 2013, now Pat. No. 8,950,038, which is a continuation of application No. 13/314,414, filed on Dec. 8, 2011, now Pat. No. 8,584,307, which is a continuation of application No. 11/633,886, filed on Dec. 4, 2006, now Pat. No. 8,584,305.

(60) Provisional application No. 60/741,442, filed on Dec. 2, 2005.

(51) Int. Cl.

| | | |
|---|---|---|
| *A47L 9/00* | (2006.01) | |
| *A47L 9/28* | (2006.01) | |
| *A47L 9/30* | (2006.01) | |
| *B25J 5/00* | (2006.01) | |
| *B25J 9/16* | (2006.01) | |
| *B25J 11/00* | (2006.01) | |
| *A47L 11/40* | (2006.01) | |
| *B60L 15/20* | (2006.01) | |
| *A47L 5/30* | (2006.01) | |
| *A47L 9/04* | (2006.01) | |
| *G05D 1/02* | (2020.01) | |
| *B60L 50/52* | (2019.01) | |
| *B60L 53/14* | (2019.01) | |
| *A47L 9/12* | (2006.01) | |
| *B25J 13/00* | (2006.01) | |
| *A47L 9/14* | (2006.01) | |
| *B60L 1/00* | (2006.01) | |
| *B60R 19/38* | (2006.01) | |
| *H04L 1/16* | (2023.01) | |
| *B60L 53/31* | (2019.01) | |
| *H04B 1/02* | (2006.01) | |
| *H04B 1/06* | (2006.01) | |

(52) U.S. Cl.
CPC ........... *A47L 9/0466* (2013.01); *A47L 9/0477* (2013.01); *A47L 9/0488* (2013.01); *A47L 9/12* (2013.01); *A47L 9/1409* (2013.01); *A47L 9/2826* (2013.01); *A47L 9/2852* (2013.01); *A47L 9/2857* (2013.01); *A47L 9/2894* (2013.01); *A47L 9/30* (2013.01); *A47L 11/24* (2013.01); *A47L 11/40* (2013.01); *A47L 11/4013* (2013.01); *A47L 11/4027* (2013.01); *A47L 11/4041* (2013.01); *A47L 11/4061* (2013.01); *A47L 11/4072* (2013.01); *B25J 5/007* (2013.01); *B25J 9/0003* (2013.01); *B25J 9/1666* (2013.01); *B25J 9/1694* (2013.01); *B25J 11/0085* (2013.01); *B25J 13/006* (2013.01); *B60L 1/003* (2013.01); *B60L 15/2036* (2013.01); *B60L 50/52* (2019.02); *B60L 53/14* (2019.02); *B60R 19/38* (2013.01); *G05D 1/028* (2013.01); *G05D 1/0225* (2013.01); *G05D 1/0227* (2013.01); *G05D 1/0234* (2013.01); *G05D 1/0242* (2013.01); *G05D 1/0255* (2013.01); *G05D 1/0272* (2013.01); *G05D 1/0274* (2013.01); *A47L 2201/00* (2013.01); *A47L 2201/04* (2013.01); *B60L 53/31* (2019.02); *B60L 2200/40* (2013.01); *B60L 2250/10* (2013.01); *B60L 2250/16* (2013.01); *B60L 2260/32* (2013.01); *G05D 2201/0203* (2013.01); *G05D 2201/0215* (2013.01); *H04B 1/02* (2013.01); *H04B 1/06* (2013.01); *H04L 1/16* (2013.01); *Y02P 90/60* (2015.11); *Y02T 10/64* (2013.01); *Y02T 10/70* (2013.01); *Y02T 10/7072* (2013.01); *Y02T 10/72* (2013.01); *Y02T 90/14* (2013.01); *Y02T 90/16* (2013.01); *Y10S 901/01* (2013.01); *Y10S 901/50* (2013.01)

(58) Field of Classification Search
CPC ........ A47L 9/0477; A47L 9/0488; A47L 9/12; A47L 9/1409; A47L 9/2826; A47L 9/2852; A47L 9/2857; A47L 9/2894; A47L 9/30; A47L 11/24; A47L 11/40; A47L 11/4013; A47L 11/4027; A47L 11/4041; A47L 11/4061; A47L 11/4072; A47L 2201/00; A47L 2201/04; B25J 5/007; B25J 9/0003; B25J 9/1666; B25J 9/1694; B25J 11/0085; B25J 13/006; B60L 1/003; B60L 15/2036; B60L 50/52; B60L 53/14; B60L 53/31; B60L 2200/40; B60L 2250/10; B60L 2250/16; B60L 2260/32; B60R 19/38; G05D 1/0225; G05D 1/0227; G05D 1/0234; G05D 1/0242; G05D 1/0255; G05D 1/0272; G05D 1/0274; G05D 1/028; G05D 2201/0203; G05D 2201/0215; G05D 1/02; H04B 1/02; H04B 1/06; H04L 1/16; Y02P 90/60; Y02T 10/64; Y02T 10/70; Y02T 10/7072; Y02T 10/72; Y02T 90/14; Y02T 90/16; Y10S 901/01; Y10S 901/50
See application file for complete search history.

(56) References Cited

U.S. PATENT DOCUMENTS

| | | | |
|---|---|---|---|
| 5,154,617 | A | 10/1992 | Suman et al. |
| 5,174,222 | A | 12/1992 | Rogers |
| 6,389,329 | B1 | 5/2002 | Colens |
| 6,459,955 | B1 | 10/2002 | Bartsch et al. |
| 6,481,515 | B1 | 11/2002 | Kirkpatrick et al. |
| 6,491,127 | B1 | 12/2002 | Holmberg et al. |
| 6,532,404 | B2 | 3/2003 | Colens |
| 6,594,844 | B2 | 7/2003 | Jones |
| 6,605,156 | B1 | 8/2003 | Clark et al. |
| 6,690,134 | B1 | 2/2004 | Jones et al. |
| 6,781,338 | B2 | 8/2004 | Jones et al. |
| 6,809,490 | B2 | 10/2004 | Jones et al. |
| 6,877,574 | B2 | 4/2005 | Thompson |
| 6,883,201 | B2 | 4/2005 | Jones et al. |
| 6,965,209 | B2 | 11/2005 | Jones et al. |
| 7,155,308 | B2 | 12/2006 | Jones |
| 7,173,391 | B2 | 2/2007 | Jones et al. |
| 7,196,487 | B2 | 3/2007 | Jones et al. |
| 7,213,663 | B2 | 5/2007 | Kim et al. |
| 7,275,280 | B2 | 10/2007 | Haegermarck et al. |
| 7,388,343 | B2 | 6/2008 | Jones et al. |
| 7,389,156 | B2 | 6/2008 | Ziegler et al. |
| 7,441,298 | B2 | 10/2008 | Svendsen et al. |
| 7,448,113 | B2 | 11/2008 | Jones et al. |
| 7,571,511 | B2 | 8/2009 | Jones et al. |
| 7,636,982 | B2 | 12/2009 | Jones et al. |
| 7,761,954 | B2 | 7/2010 | Ziegler et al. |
| 7,765,635 | B2 | 8/2010 | Park |
| 7,861,365 | B2 | 1/2011 | Sun et al. |
| 8,584,305 | B2 | 11/2013 | Won et al. |
| 8,584,307 | B2 | 11/2013 | Won et al. |
| 8,950,038 | B2 | 2/2015 | Won et al. |
| 10,070,763 | B2 | 9/2018 | Won et al. |
| 10,524,629 | B2 | 1/2020 | Won et al. |
| 2002/0016649 | A1 | 2/2002 | Jones |
| 2002/0108209 | A1 | 8/2002 | Peterson |
| 2002/0120364 | A1 | 8/2002 | Colens |
| 2003/0025472 | A1 | 2/2003 | Jones et al. |
| 2003/0060928 | A1 | 3/2003 | Abramson et al. |
| 2003/0120389 | A1 | 6/2003 | Abramson et al. |
| 2004/0019406 | A1 | 1/2004 | Wang et al. |
| 2004/0020000 | A1 | 2/2004 | Jones |

(56) References Cited

U.S. PATENT DOCUMENTS

| | | |
|---|---|---|
| 2004/0049877 A1 | 3/2004 | Jones et al. |
| 2004/0187457 A1 | 9/2004 | Colens |
| 2004/0195012 A1 | 10/2004 | Song et al. |
| 2004/0204792 A1 | 10/2004 | Taylor et al. |
| 2004/0207355 A1 | 10/2004 | Jones et al. |
| 2004/0262060 A1 | 12/2004 | Kim et al. |
| 2005/0046373 A1 | 3/2005 | Aldred |
| 2005/0055792 A1 | 3/2005 | Kisela |
| 2005/0067994 A1 | 3/2005 | Jones et al. |
| 2005/0162119 A1 | 7/2005 | Landry et al. |
| 2005/0192707 A1 | 9/2005 | Park et al. |
| 2005/0204717 A1 | 9/2005 | Colens |
| 2006/0103523 A1 | 5/2006 | Field |
| 2007/0016328 A1 | 1/2007 | Ziegler et al. |
| 2007/0061040 A1 | 3/2007 | Augenbraun |
| 2007/0080000 A1 | 4/2007 | Tobey et al. |
| 2007/0234492 A1 | 10/2007 | Svendsen et al. |
| 2007/0244610 A1 | 10/2007 | Ozick et al. |
| 2007/0250212 A1 | 10/2007 | Halloran et al. |
| 2007/0266508 A1 | 11/2007 | Jones et al. |
| 2008/0140255 A1 | 6/2008 | Ziegler et al. |
| 2008/0155768 A1 | 7/2008 | Ziegler et al. |
| 2008/0307590 A1 | 12/2008 | Jones et al. |
| 2009/0007366 A1 | 1/2009 | Svendsen et al. |
| 2010/0049365 A1 | 2/2010 | Jones et al. |
| 2010/0257690 A1 | 10/2010 | Jones et al. |
| 2010/0257691 A1 | 10/2010 | Jones et al. |
| 2010/0263158 A1 | 10/2010 | Jones et al. |
| 2012/0173064 A1 | 7/2012 | Won et al. |
| 2014/0026354 A1 | 1/2014 | Won et al. |
| 2014/0352103 A1 | 12/2014 | Won et al. |
| 2017/0215666 A1 | 8/2017 | Won et al. |

FOREIGN PATENT DOCUMENTS

| | | |
|---|---|---|
| JP | S55-124238 | 9/1980 |
| JP | 60137332 | 7/1985 |
| JP | 6330934 | 2/1988 |
| JP | S63-158032 | 7/1988 |
| JP | H02-15417 | 1/1990 |
| JP | 4266734 | 9/1992 |
| JP | 05-295783 | 11/1993 |
| JP | H06-248621 | 9/1994 |
| JP | 07-046710 | 2/1995 |
| JP | 7059702 | 6/1995 |
| JP | H09251318 | 9/1997 |
| JP | H09-325814 | 12/1997 |
| JP | 2000207215 | 7/2000 |
| JP | 2000342496 | 12/2000 |
| JP | 2000342497 | 12/2000 |
| JP | 2001084037 | 3/2001 |
| JP | 2002016684 | 1/2002 |
| JP | 2002092762 | 3/2002 |
| JP | 2002312275 | 10/2002 |
| JP | 2002321180 | 11/2002 |
| JP | 2002354139 | 12/2002 |
| JP | 2002355205 | 12/2002 |
| JP | 2002360479 | 12/2002 |
| JP | 2003016203 | 1/2003 |
| JP | 2003018670 | 1/2003 |
| JP | 2003501120 | 1/2003 |
| JP | 2003061882 | 3/2003 |
| JP | 2003521204 | 7/2003 |
| JP | 2004097264 | 4/2004 |
| JP | 2004135993 | 5/2004 |
| JP | 2004515090 | 5/2004 |
| JP | 2004159736 | 6/2004 |
| JP | 2004160164 | 6/2004 |
| JP | 2004195215 | 7/2004 |
| JP | 20040262060 | 9/2004 |
| JP | 2005040597 | 2/2005 |
| JP | 2005052552 | 3/2005 |
| JP | 2005211368 | 8/2005 |
| JP | 2005216209 | 8/2005 |
| JP | 2005218559 | 8/2005 |
| JP | 2005296511 | 10/2005 |
| JP | 5035330 | 9/2012 |
| WO | WO 2001091623 | 12/2001 |
| WO | WO 2005077244 | 8/2005 |
| WO | 2005083541 A1 | 9/2005 |

OTHER PUBLICATIONS (No Author Listed), "Electrolux Diamond Jubilee 1521 Caster Wheel," eVacuumstore.com, 2020, retrieved from URL: https://evacuumstore.com/p-5847-electrolux-diamond-jubilee-1521-caster-wheel.aspx, retrieved on Sep. 23, 2020, 7 pages (Exhibit No. 1019 in IPR2020-01641).

(No Author Listed), "Eureka Power-Team with Roto-Matic Head: Model 1288," The Eureka Company, 1975, 28 pages (Exhibit No. 1026 in IPR2020-1641).

(No Author Listed), "Meet the Eureka Empress," Eureka Williams Company, 1966, 23 pages (Exhibit No. 1025 in IPR2020-01641).

Certified English translation of CN Patent No. 2664579Y, issued on Dec. 22, 2004, 28 pages (Exhibit No. 1005 in IPR2020-01641).

Curriculum Vitae of Joseph A. Fester, (undated), 2 pages (Exhibit No. 1024 in IPR2020-01641).

Declaration of Joseph Fester, dated Oct. 1, 2020, 77 pages (Exhibit No. 1006 in IPR2020-01641).

District of Massachusetts, "In Re: Coronavirus Public Emergency: Second Supplemental Order Concerning Jury Trials and Related Proceedings," General Order 20-21, dated May 27, 2020, 2 pages (Exhibit 1018 in IPR2020-01641).

*IRobot Corporation v. Sharkninja Operating LLC, et al.*, "Excerpt from Infringement Contentions served by iRobot Corporation," Civil Action 1:19-cv-12125-ADB, dated Jan. 17, 2020, 1 pages (Exhibit No. 1016 in IPR2020-01641).

*IRobot Corporation v. Sharkninja Operating LLC, et al.*, "Excerpt from Transcript of Markman Hearing," Civil Action No. 1:19-cv-12125-ADB, dated Aug. 5, 2020, 3 pages (Exhibit No. 1023 in IPR2020-01641).

*IRobot Corporation v. Sharkninja Operating LLC, et al.*, "Joint Claim Construction Chart," Civil Action No. 1:19-cv-12125-ADB, dated Apr. 30, 2020, 10 pages (Exhibit No. 1013 in IPR2020-01641).

*IRobot Corporation v. Sharkninja Operating LLC, et al.*, "Stipulated Scheduling Order," Civil action No. 1:19-cv-12125-ADB, filed on Jan. 24, 2020, 5 pages (Exhibit No. 1017 in IPR2020-01641).

*IRobot Corporation v. Sharkninja Operating LLC, et al.*, "Summons in a Civil Action," Civil Action No. 1:19-cv-12125-ADB, dated Oct. 15-16, 2019, 3 pages (Exhibit No. 1011 in IPR2020-01641).

Prosecution History of U.S. Appl. No. 14/037,008, filed Oct. 15, 2019, 643 pages (Exhibit No. 1007 in IPR2020-01641).

*Sharkninja Operating LLC, Sharkninja Management LLC, and Sharkninja Sales Company v. iRobot Corporation*, "Petition for Inter Partes Review of U.S. Pat. No. 8,950,038," Case No. IPR2020-01641, filed on Oct. 1, 2020, 81 pages.

*Sharkninja Operating LLC, v. iRobot Corporation*, "Complaint for Declaratory Judgment," Civil Action No. 1:19-cv-12125-ADB, dated Oct. 11, 2019, 12 pages (Exhibit No. 1012 in IPR2020-01641).

U.S. Pat. No. 1,341,630, issued on Jun. 1, 1920, Chesnutt, 4 pages (Exhibit No. 1022 in IPR2020-01641).

U.S. Pat. No. 5,440,780, issued on Aug. 15, 1995, Rakocy et al., 13 pages (Exhibit No. 1003 in IPR2020-01641).

U.S. Pat. No. 8,584,305, issued on Nov. 19, 2013, Won et al., 46 pages (Exhibit No. 1014 in IPR2020-01641).

U.S. Pat. No. 8,584,307, issued on Nov. 19, 2013, Won et al., 41 pages (Exhibit No. 1015 in IPR2020-01641).

U.S. Pat. No. 8,950,038, issued on Feb. 10, 2015, Won et al., 48 pages (Exhibit No. 1001 in IPR2020-01641).

U.S. Appl. No. 60/741,442, filed Dec. 2, 2005, 137 pages (Exhibit 1010 in IPR2020-01641).

US Publication No. 2004/0049877, published on Mar. 18, 2004, Rakocy et al., 29 pages (Exhibit No. 1002 in IPR2020-01641).

(56) References Cited

OTHER PUBLICATIONS

US Publication No. 2007/0209153, published on Sep. 13, 2007. Mersmann et al., 11 pages (Exhibit No. 1021 in IPR2020-01641).
WO Publication No. 2006/089307, published on Aug. 24, 2006, Ziegler et al., 205 pages (Exhibit No. 1004 in IPR2020-01641).
[No Author Listed,] "Roomba Discovery Series Service Manual," iRobot, Aug. 31, 2006, 87 pages.
[No Author Listed,] "Roomba Discovery User Manual," iRobot, Jul. 6, 2004, 10 pages.
[No Author Listed], "Friendly Vac RV400 product manual," Friendly Robotics, 2004, 24 pages.
Doty et al., "Sweep Strategies for a Sensory-Driven, Behavior-Based Vacuum Cleaning Agent," AAAI 1993 Fall Symposium Series, Instantiating Real-World Agents, pp. 1-6, Oct. 22-24, 1993.
Electrolux, "Welcome to the Electrolux trilobite," Retrieved from the Internet: URL<www.electroluxusa.com/node57.asp?currentURL=node142.asp%3F>. 2 pages, Mar. 2005.
Everett, H.R., "Sensors for Mobile Robots," AK Peters, Ltd., Wellesley, MA, (1995).
Facts on Trilobite, webpage, Retrieved from the Internet: URL<http://trilobiteelectroluxse/presskit_en/model11335asp?print=yes&pressID=>. 2 pages, accessed Dec. 2003.
Hitachi: News release: "The home cleaning robot of the autonomous movement type (experimental machine)," Retrieved from the Internet: URL< www.i4u.com./japanreleases/hitachirobot.htm>. 5 pages, Mar. 2005.
Honda Motor Co., Ltd., English Translation of JP11212642, Aug. 9, 1999, 31 pages.
*IRobot Corporation* v. *Sharkninja Operating, LLC* et al., "SharkNinja's Invalidity Contentions, Appendix B1," Civil Action No. 1:19-cv-12125-ADB (D. Mass.), Mar. 2020, U.S. Pat. No. 8,950,038, 127 pages.
*IRobot Corporation* v. *Sharkninja Operating, LLC* et al., "SharkNinja's Invalidity Contentions, Appendix B2," Civil Action No. 1:19-cv-12125-ADB (D. Mass.), Mar. 2020, U.S. Pat. No. 8,950,038, 132 pages.
*IRobot Corporation* v. *Sharkninja Operating, LLC* et al., "SharkNinja's Invalidity Contentions, Appendix B3," Civil Action No. 1:19-cv-12125-ADB (D. Mass.), Mar. 2020, U.S. Pat. No. 8,950,038, 132 pages.
*IRobot Corporation* v. *Sharkninja Operating, LLC* et al., "SharkNinja's Invalidity Contentions, Appendix B4," Civil Action No. 1:19-cv-12125-ADB (D. Mass.), Mar. 2020, U.S. Pat. No. 8,950,038, 105 pages.
*IRobot Corporation* v. *Sharkninja Operating, LLC* et al., "SharkNinja's Invalidity Contentions, Appendix B5," Civil Action No. 1:19-cv-12125-ADB (D. Mass.), Mar. 2020, U.S. Pat. No. 8,950,038, 103 pages.
*IRobot Corporation* v. *Sharkninja Operating, LLC* et al., "SharkNinja's Invalidity Contentions, Appendix B6," Civil Action No. 1:19-cv-12125-ADB (D. Mass.), Mar. 2020, U.S. Pat. No. 8,950,038, 125 pages.
*IRobot Corporation* v. *Sharkninja Operating, LLC* et al., "SharkNinja's Invalidity Contentions, Appendix B7," Civil Action No. 1:19-cv-12125-ADB (D. Mass.), Mar. 2020, U.S. Pat. No. 8,950,038, 145 pages.
*IRobot Corporation* v. *Sharkninja Operating, LLC* et al., "SharkNinja's Invalidity Contentions, Appendix B8," Civil Action No. 1:19-cv-12125-ADB (D. Mass.), Mar. 2020, U.S. Pat. No. 8,950,038, 103 pages.
Jones, J., Roth, D., "Robot Programming: A Practical Guide to Behavior-Based Robotics," McGraw-Hill Education TAB, (Jan. 2, 2004) 288 pages.
Karcher "Karcher RoboCleaner RC 3000," Retrieved from the Internet: URL<www.robocleaner.de/english/screen3.html>. 4 pages, Dec. 2003.
Karcher RC 3000 Robotic Cleaner, Product page, accessed online <http://www.karcher-usa.com/showproducts.php?op=view_prod&param1=143&param2=&param3=> Mar. 18, 2005, 3 pages.
Karcher, Product Manual Download, 2003, 16 pages.
Prassler et al., English Translation of DE19849978, Feb. 8, 2001, 16 pages.
Extended European Search Report in European Application No. 10182968.7, dated Aug. 2, 2012, 3 pages.
*Sharkninja Operating LLC, Sharkninja Management LLC, and Sharkninja Sales Company*, Petitioners v. *iRobot Corporation*, Patent Owner, Case IPR2020-01641, U.S. Pat. No. 8,950,038, Decision Settlement Prior to Institution of Trial, filed Feb. 1, 2021, 4 pages.
*IRobot Corporation*, Plaintiff, v. *Sharkninja Operating LLC, Sharkninja Management LLC, and Sharkninja Sales Company*, Defendants. United States District Court District of Massachusetts, Memorandum and Order on Claim Construction, Civil Action No. 19-cv-12125-ADB, Document 173, filed Jan. 14, 2021, 39 pages (IPR2020-01641, Exhibit 2001).
PCT International Preliminary Report on Patentability in International Application No. PCT/US2006/046404, dated Jun. 12, 2008, 6 pages.
PCT International Search Report and Written Opinion in International Application No. PCT/US2006/046404, dated Apr. 2, 2007, 10 pages.
*Sharkninja Operating LLC, Sharkninja Management LLC, and Sharkninja Sales Company*, Petitioners v. *iRobot Corporation*, Patent Owner, Case IPR2020-01641, U.S. Pat. No. 8,950,038, Patent Owner's Preliminary Response, filed on Jan. 19, 2021, 42 pages.
*Sharkninja Operating LLC, Sharkninja Management LLC, and Sharkninja Sales Company*, Petitioners v. *iRobot Corporation*, Patent Owner, Case IPR2020-01641, U.S. Pat. No. 8,950,038, Petitioners and Patent Owner's Joint Request to File Settlement Agreement as Business Confidential Information Pursuant to 35 U.S.C. § 317, filed Jan. 25, 2021, 4 pages.
*Sharkninja Operating LLC, Sharkninja Management LLC, and Sharkninja Sales Company*, Petitioners v. *iRobot Corporation*, Patent Owner, Case IPR2020-01641, U.S. Pat. No. 8,950,038, Petitioners' and Patent Owner's Joint Motion to Terminate Inter Partes Review Proceedings Pursuant to 35 U.S.C. § 317(a), filed Jan. 25, 6 pages.

MODULAR ROBOT

CROSS REFERENCE TO RELATED APPLICATIONS

This application is a continuation (and claims the benefit of priority under 35 USC 120) of U.S. application Ser. No. 14/461,733, filed Aug. 18, 2014, which is a continuation of U.S. application Ser. No. 14/037,008, filed Sep. 25, 2013, which is a continuation of U.S. application Ser. No. 13/314,414, filed Dec. 8, 2011, which is a continuation of U.S. application Ser. No. 11/633,886, filed Dec. 4, 2006, as well as claims priority under 35 U.S.C. 119(e) to a U.S. provisional patent application filed on Dec. 2, 2005, entitled "ROBOT NETWORKING, THEMING AND COMMUNICATION SYSTEM" and having assigned Ser. No. 60/741,442. The disclosure of the prior applications are considered part of (and are incorporated by reference in) the disclosure of this application.

TECHNICAL FIELD

This invention relates to robots, and more particularly to coverage robots.

BACKGROUND

In the field of home, office and/or consumer-oriented robotics, mobile robots that perform household functions such as vacuum cleaning have been widely adopted, and examples of robots that perform floor washing, patrolling, lawn cutting and other such tasks may be found. Mobile robots contain many components, some of which may wear out or require service before other components. Generally, when one component fails the robot may be greatly hindered or fail as a whole. A user may be required to send the whole robot to a repair service for servicing, which may then require disassembling significant portions of the robot, or if the repair cost exceeds the value of the robot, the robot may be discarded. Alternatively, the user may need to purchase an entirely new robot.

SUMMARY

Coverage robots have a number of components that may require periodic servicing over the life of the robot. A coverage robot is used for covering a surface. This includes cleaning as well as polishing, painting, resurfacing, sweeping, sterilizing, applying treatments, and more. A modular coverage robot that allows the removal of discrete components or assemblies for repair or replacement improves the serviceability of the robot and increases the overall life of the robot. In addition, some modules can be changed for an alternative module that fits in the same shaped cavity but has different functionality. In general, the following modules can be removed from a coverage robot and replaced without affecting the functionality of the robot: a main cleaning head, a side brush cleaning head, a wheel module, a vacuum bin, a replaceable upper panel or cover, a remote control dockable in a cover, a replaceable lower retaining panel, cover or skid, a battery, a bumper, and a front wheel caster.

In one aspect, the coverage robot includes a chassis, multiple drive wheel assemblies disposed on the chassis, and a working assembly including a working head (e.g., cleaning assembly) carried by the chassis. Each drive wheel assembly (e.g., drive wheel module) includes a drive wheel assembly housing, a wheel rotatably coupled to the housing, and a wheel drive motor carried by the drive wheel assembly housing and operable to drive the wheel. The cleaning assembly (e.g., work head module) includes a cleaning assembly housing, a cleaning head rotatably coupled (e.g., a work head coupled for working movement) to the cleaning assembly housing, and a cleaning drive motor carried by cleaning assembly housing and operable to drive the cleaning head. The wheel assemblies and the cleaning assembly are each separately and independently removable from respective receptacles of the chassis as cartridges or complete units. The receptacles may be shaped cavities having receiving walls which surround and guide matching outer wall shapes of a cartridge or module, such that each module slips into and fits a corresponding shaped cavity. Parallel with at least one (e.g., insertion) direction, the walls of the module and corresponding shaped cavity may be essentially parallel, so that a module is guided to enter a mating shaped cavity along a straight line. The modules may be secured in the chassis by fasteners and/or an access or retaining cover.

In one implementation, each drive wheel assembly also includes a linkage suspending the wheel from a forward portion of the chassis. By connecting a first end of the linkage to a forward portion of the chassis and allowing the wheel connected to a second end of the linkage to move radially about the first end of the linkage and vertically with respect to the chassis, the robot can traverse thresholds and transitions easier than a robot without such a linkage. The linkage also facilitates an upwind tilt of the chassis in response to torque from the wheel which also aids the robot's traversal of thresholds and transitions.

In another example, wheel assembly (modular or not modular) includes at least part of a proximity sensor to detect an absence of an adjacent floor. The proximity sensor may be an infrared (IR) emitter and receiver pair, where the IR emitter and receiver are located on either side of the wheel and positioned to emit and receive an IR beam emitted at an angle that reflects off a floor surface below the wheel. In the absence of a floor, the emitted IR beam is not reflected off the floor and not received by the IR receiver. When the proximity sensor senses an absence of the floor, a robot controller is notified so as to initiate a cliff avoidance maneuver.

In one implementation, each wheel assembly also includes a power connector disposed on an outer surface of the drive wheel assembly housing and configured to mate with a corresponding chassis power connector within its respective receptacle as the drive wheel assembly is placed within the receptacle, to establish an electric power connection to the wheel assembly. Similarly, the cleaning assembly may also include a power connector disposed on an outer surface of the cleaning assembly housing and configured to mate with a corresponding chassis power connector within its respective receptacle as the cleaning assembly is placed within the receptacle, to establish an electric power connection to the cleaning assembly. The connectors may align with one another in a straight line as a module in guided to enter a mating shaped cavity along a straight line.

In some implementations, the power connector for each module is a tool-less (operable without tools) module-side electrical plugs that mates with a corresponding tool-less module-side electrical plugs on the chassis.

In one example, the cleaning robot also includes an electric battery or electrochemical cell carried by the chassis. The electric battery provides power to the robot.

In another example, the cleaning robot includes a removable caster wheel assembly disposed on the chassis. The removable caster wheel assembly provides additional support between the robot and the floor.

In another example, the robot includes a removable cover (e.g., a retaining or access cover) secured to a bottom of the chassis. The cover secures each wheel assembly and cleaning assembly within their respective receptacles. The robot may also include a removable cover (e.g., an aesthetic or functional panel, e.g., as disclosed in U.S. Provisional Patent Application No. 60/741,442, herein incorporated by reference in its entirety) disposed on an upper portion of the chassis. The removable cover on the upper portion of the chassis allows an owner to attach themed or functional covers or panels having a variety of colors and indicia; or, e.g., additional sensors for, e.g., navigation or obstacle detection. In one instance, the removable cover includes a segmented maintenance display panel substantially mimicking the appearance of the robot.

Illuminable indicia corresponding to each module receptacle is disposed on the segmented maintenance display. The module receptacles individually correspond to a drive wheel assembly, cleaning assembly, battery, or cleaning bin, respectively. In another instance, the removable cover includes an audio output device for delivering instructions or alerting a user of a jam or some other problem with the robot. The controller board on the robot controls the illumination of indicia and the audio responses from the audio output device to communicate service needs or instructions to a user.

The controller may use the illuminable indicia to communicate information to a user. Some examples include: a steady light indicates module issue; a blinking light indicates usage of a module; no blinking light during normal rotation of the cleaning head during cleaning; blinking light during reverse rotation of the cleaning head during a surface prep operation.

In some implementations, the robot includes a removable bumper disposed on a forward portion of the chassis. The bumper protects the robot and objects that come in contact with the bumper.

In one example, the cleaning robot includes a cleaning bin carried by the chassis and arranged to collect debris (including, e.g., waste liquid) removed from a work surface by the cleaning head. The cleaning bin may include a bin housing defining a debris cavity and a filter cavity, as well as a bin filter, and a bin cover. More than one debris cavity may be provided, e.g., a swept debris cavity and a vacuumed debris cavity. If a cleaning treatment or fluid is applied, a cleaning bin may include a clean fluid dispensing portion. The debris cavity is configured to collect debris removed from a work surface by the cleaning head. The filter cavity is configured to collect debris removed from a work surface by a vacuum fan in fluid communication with the filter cavity. The bin filter is disposed in the filter cavity and is configured to substantially inhibit particulate from entering the vacuum fan. The bin cover is rotatably attached to the bin housing and configured to move between a bin closed position and a bin open position, exposing the filter cavity and the bin filter for servicing.

In one implementation, the cleaning bin also includes a bin cover spring actuator that biases the bin cover in the open position. When the cleaning bin is installed on the robot, the bin cover is held closed. When the cleaning bin is removed from the robot, the bin cover is actuated open by the spring exposing the filter cavity and the bin filter for servicing. The cleaning bin may also include a latch to hold the biased bin cover in the closed position, allowing a user to selectively open the bin cover.

In another implementation, the cleaning bin also includes for a modular ionic charged, washable, removable filterplate in the filter cavity.

In one example, the cleaning head rotation includes brushes and the direction of rotation is reversed allowing the cleaning assembly to act as a surface (carpet) prep device. In this example, the bin carries a liquid or a powder (fresheners, etc) that is dispensed by the cleaning head onto the floor surface.

The details of one or more implementations of the disclosure are set forth in the accompanying drawings and the description below. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Figure 1A:
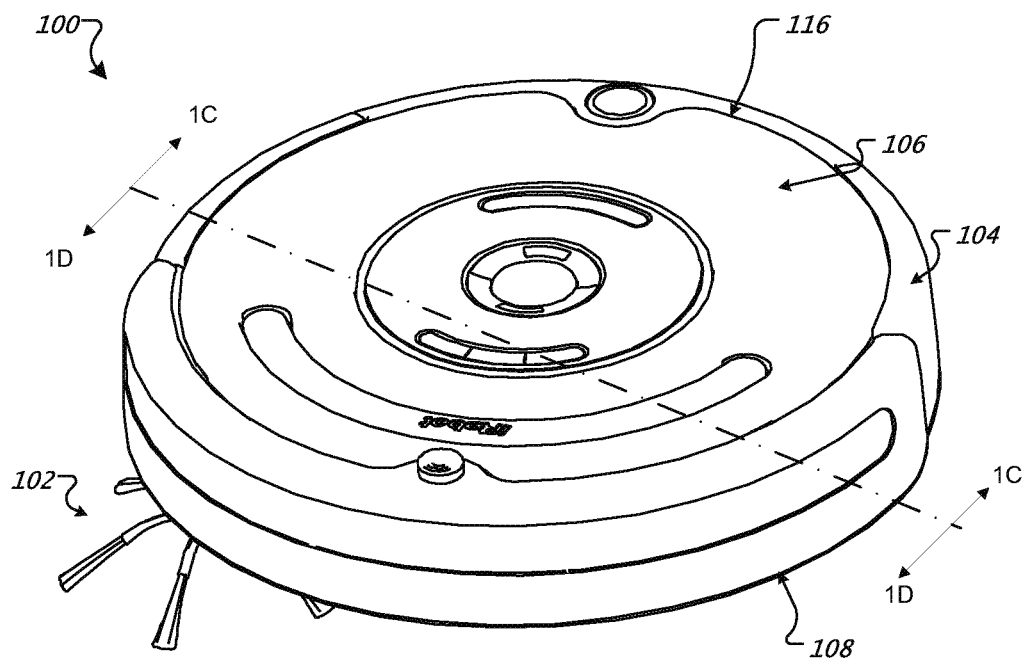
FIG. 1A is a top perspective view showing an example of a coverage robot.

FIG. 1A is a top perspective view showing an example of a coverage robot 100. The coverage robot 100 may be used to clean a work surface, such as a floor or wall by vacuuming debris brushed from the work surface. Coverage robot 100 includes modular components that are separately and independently removable from the coverage robot 100. A coverage robot is used for covering a surface. This includes cleaning as well as polishing, painting, resurfacing, sweeping, sterilizing, applying treatments, and more.

The top view of the coverage robot 100 shows a removable cleaning assembly 102, a removable top cover 104, a removable decorative cover 106, and a removable bumper 108. In one implementation, the cleaning assembly 102 moves debris on the work surface to a suction path under the coverage robot 100. The top cover 104 covers internal components on the top side of the coverage robot 100. The decorative cover 106 is used to change the appearance or style of the coverage robot 100, such as with colors or themes. The decorative cover 106 may also or alternatively be a functional panel or plate that carries sensors, interfaces, actuators, and the like (e.g., the cover 106 may be provided with some or all of its own microprocessor, mounted sensors, mounted actuators, and/or a plug interface to the robot itself). Different decorative covers 106 or different functional covers (not shown) may be interchangeably mounted as modules if they have the same outer shape, e.g., outer wall configuration matching a shaped cover-receiving cavity or recess in the robot 100. The bumper 108 protects the coverage robot 100 and objects the coverage robot 100 comes in contact with during the contact.

Modular components, such as the cleaning assembly 102, the top cover 104, the decorative cover 106, and the bumper 108, are arranged to be mountable into mating shaped receiving cavities and may be separately and independently removed from the coverage robot 100. For example, a broken or worn component may be removed and replaced with a properly functioning component or a malfunctioning component may be fixed and used again. In an alternative example, a component, such as the decorative cover 106, may be replaced to change the style or appearance of the coverage robot 100. In another example, a component may be replaced to change the function of the coverage robot 100, such as by replacing stiff brushes in the cleaning assembly 102 with soft brushes.

Figure 1B:
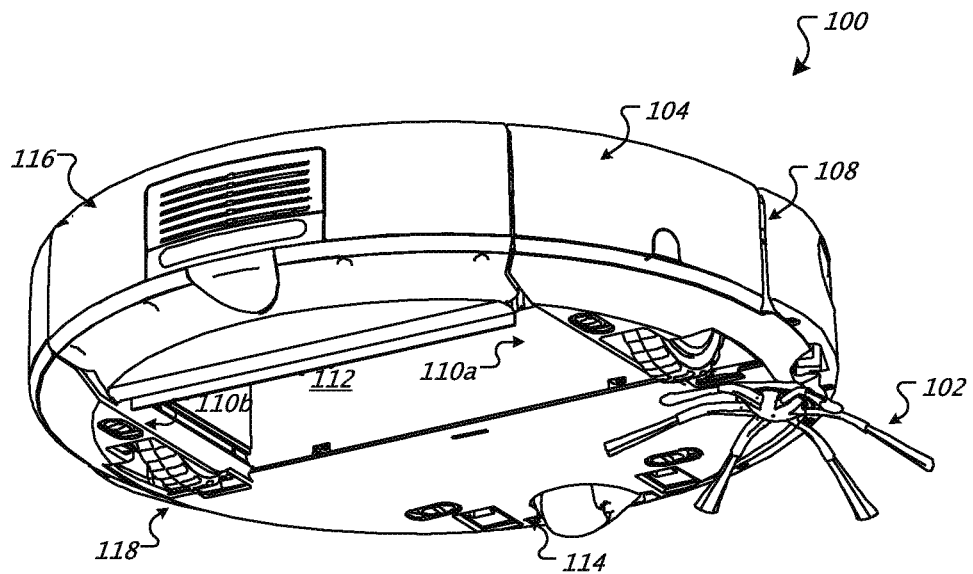
FIG. 1B is a bottom perspective view showing an example of a coverage robot.

FIG. 1B is a bottom perspective view showing an example of the coverage robot 100. The bottom view of the coverage robot 100 shows removable drive wheel assemblies 110a-b, a second removable cleaning assembly 112, a removable caster wheel assembly 114, a removable cleaning bin 116, and a removable bottom cover 118. The drive wheel assemblies 110a-b provide propulsion for the coverage robot 100. The second cleaning assembly 112 also moves debris on the work surface toward a suction path under the coverage robot 100. The caster wheel assembly 114 provides a third point of contact with the work surface. The cleaning bin 116 stores debris that the coverage robot 100 vacuums from the work surface. The bottom cover 118 helps secure shaped modules, such as the cleaning assemblies 102 and 112, the drive wheel assemblies 110a-b, and the caster wheel assembly 114 in the coverage robot 100.

Figure 1C:
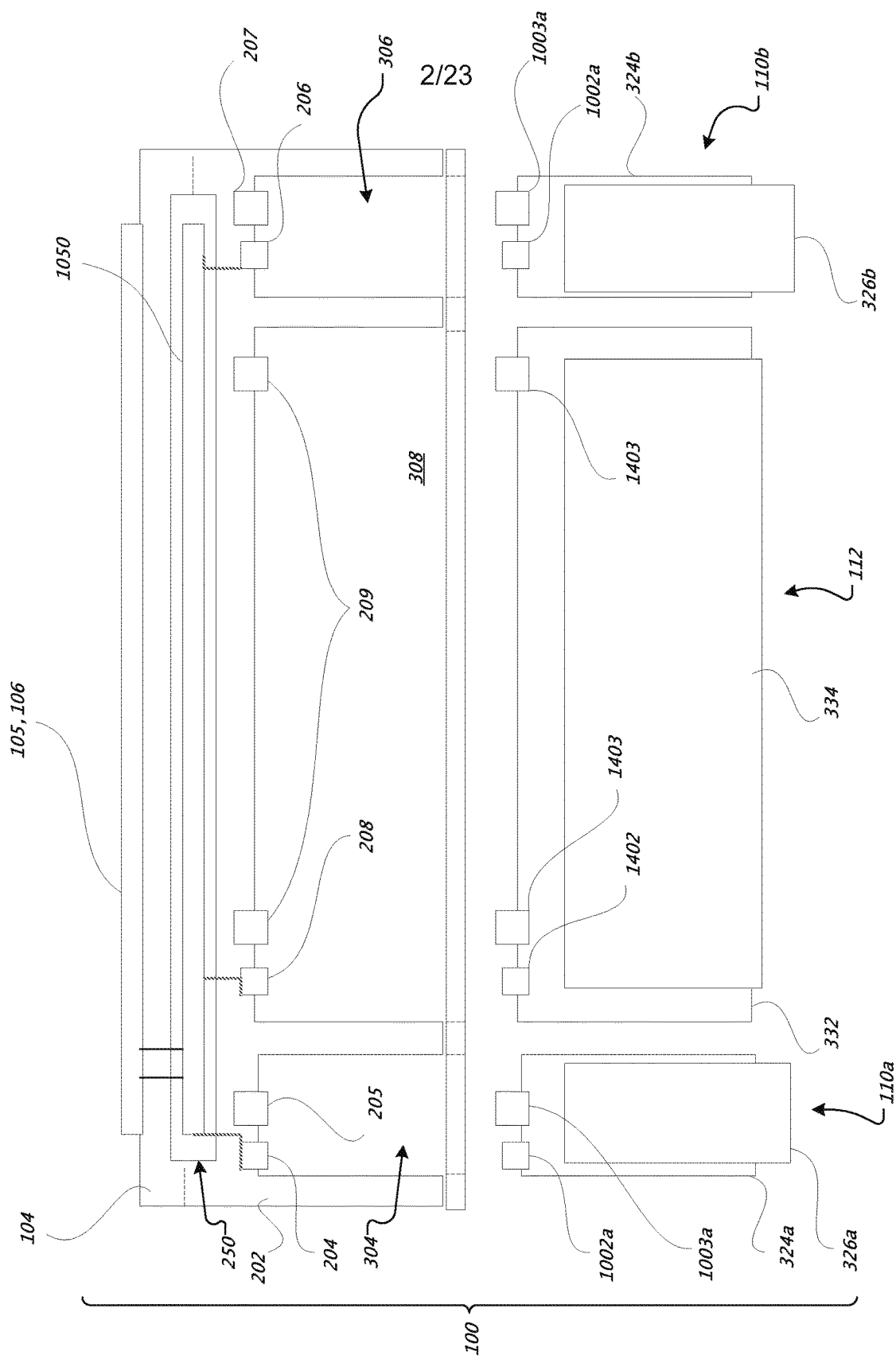
FIG. 1C is a sectional view showing an example of a coverage robot.
Figure 1D:
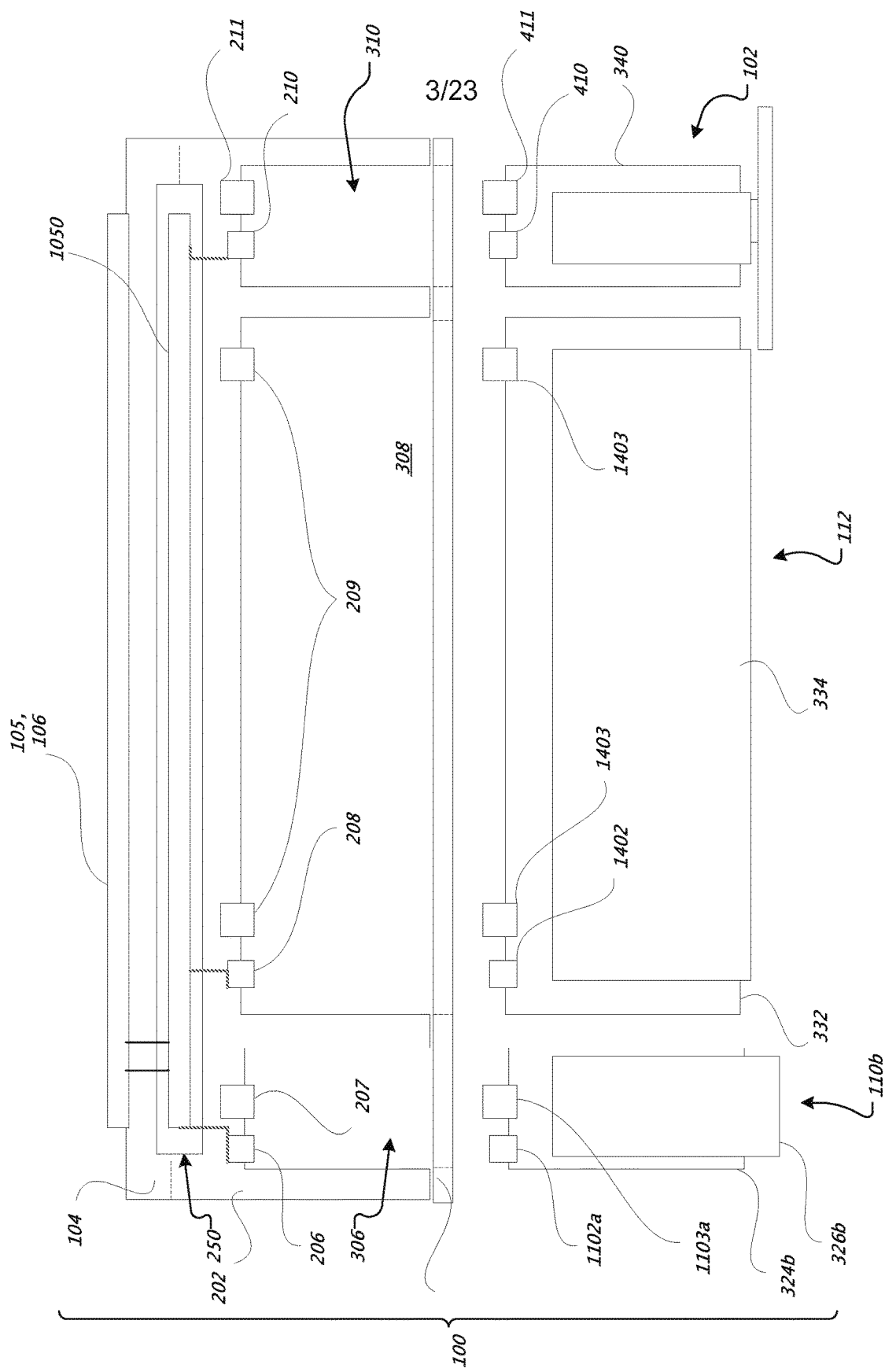
FIG. 1D is a sectional view showing an example of a coverage robot.

Referring to FIGS. 1C and 1D, shaped modules (e.g., modules 110, 112, 110b, 102 shown in schematic form) may be provided with mechanical connectors (e.g., for accepting a fastener, or that is itself a fastener) 1003a, 1403, 411 as well as electrical connectors 1002a, 1402, 410. The mechanical connectors on the shaped modules align with corresponding connectors, fixtures or hardpoints 205, 209, 211 formed in the robot chassis 202, and the electrical connectors on the shaped modules simultaneously align with mating connectors 204, 208, 206, 210 formed in the robot chassis 202, when a shaped module is e.g., slid into its mating shaped receiving cavity. This allows the modules to be securely mounted, and the power connectors to provide power to each module.

Figure 1E:
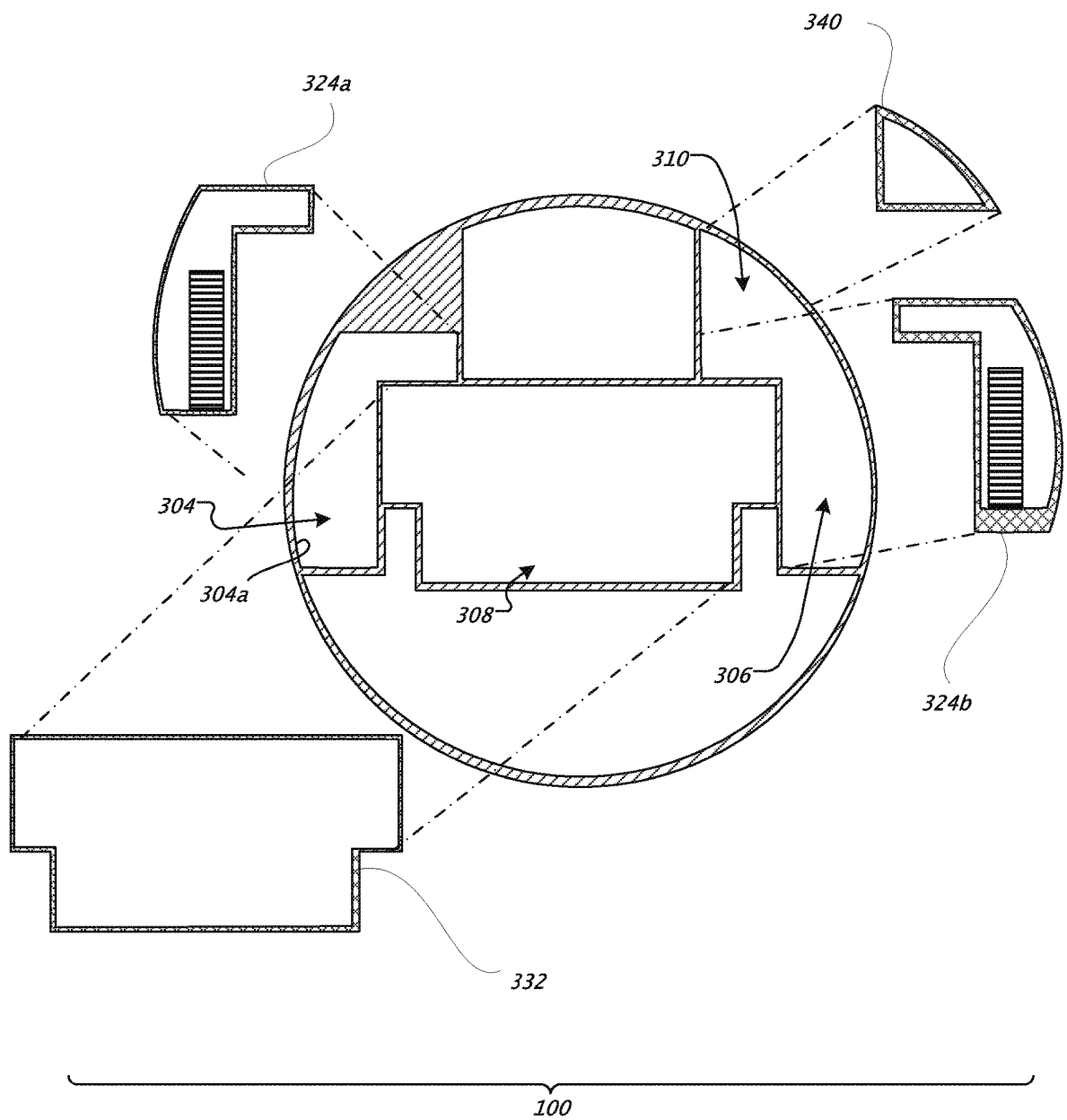
FIG. 1E is a cross-sectional view showing shaped cavities, mating modules, and parallel outer walls of a coverage robot.
Figure 1F:
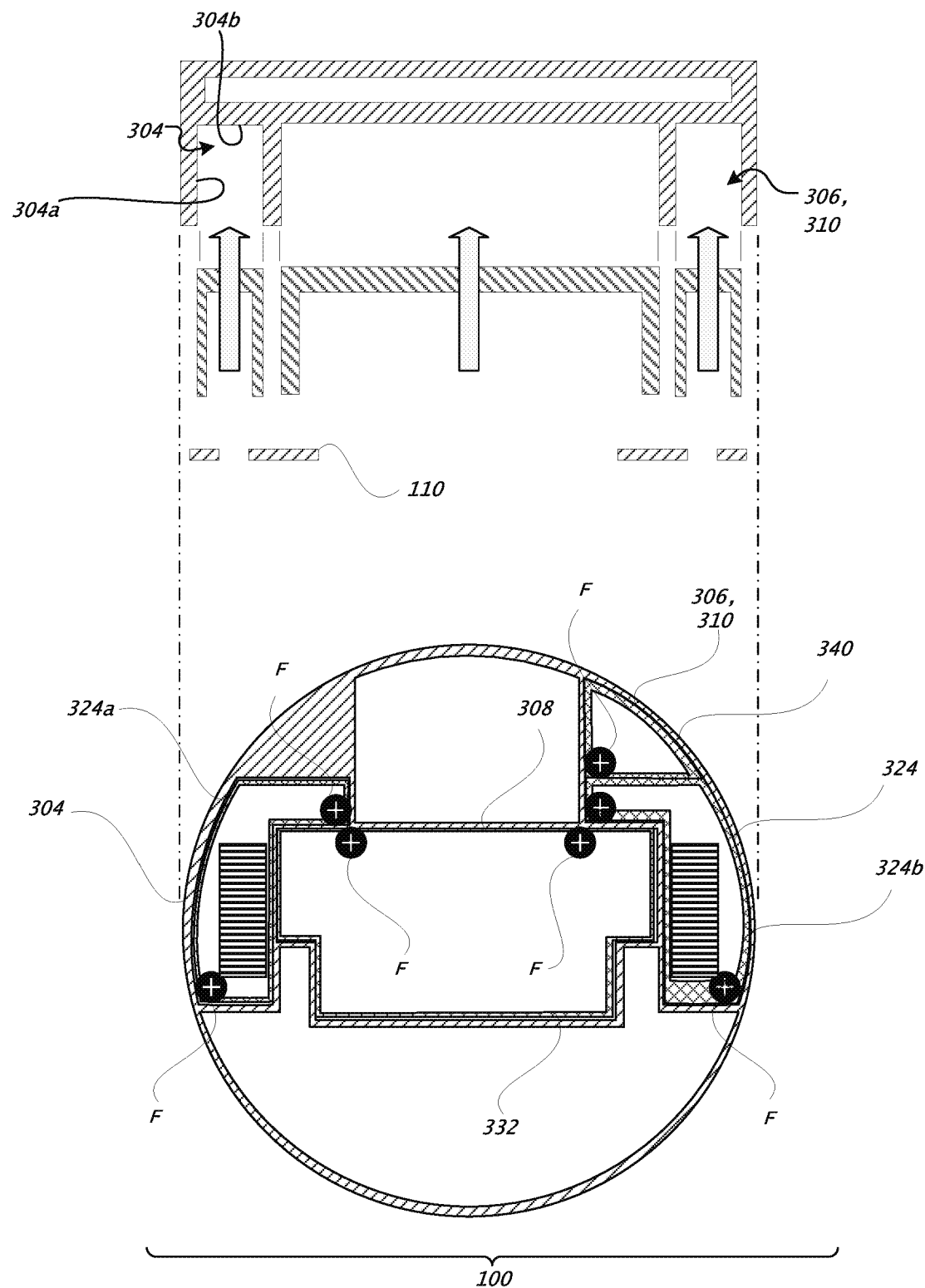
FIG. 1F is a cross-sectional view showing shaped cavities, mating modules, and parallel outer walls of a coverage robot.

Referring to FIGS. 1E and 1F, the chassis 202 is formed as a unibody structure, including downward-facing shaped receptacle cavities. In FIG. 1E, shaped receptacle 304, which matches the wheel module 110a housing, shaped receptacle 306/310, which matches the wheel module 110b housing and side brush module 340 housing and working head shaped receptacle 308, which matches the working head module housing 332, are shown. Each shaped receptacle is an irregular cup, having a plug in or on the bottom wall of the cup, a perimeter of parallel walls in the shape of the modules to be accepted, and an open side facing the bottom cover 110. As an example, parallel walls 304a and bottom wall 304b are illustrated in FIGS. 1E and 1F, although each of the shaped receptacles may have similar features. As illustrated in schematic form, the bottom of the robot 100 includes several modules. The parallel walls of the shaped receptacles and the matching parallel walls of the matching modules are a tight slip fit (if the module is to form part of the structural monocoque of the body) and a loose slip fit (if the module is to be quiet but will not significantly contribute to the rigidity of the mobile robot). As parallel walls, they permit the module to be directly slipped into the receiving shaped receptacle "cup" along the walls to the bottom (where, as discussed herein, an electrical connector to plug in the same straight direction is received by a plug at the bottom or side of the receptacle). As shown in FIGS. 1E and 1F, two neighboring shaped receptacles may share a wall (e.g., as the working head receptacle 308 shares walls with the wheel module receptacles 304, 306); and a single receptacle may receive more than one module, so long as those modules also have parallel walls where they abut one another (e.g., as the wheel module receptacle 306 and side brush module receptacle 310 are interconnected, and the wheel module wall or housing 324a and brush module housing 340 have an abutting parallel wall where the receptacles interconnect (or, e.g., form a single receptacle). As illustrated in schematic form in FIG. 1E, the modules are slid into place in the "vertical" (e.g., parallel wall) direction until they reach the bottom of their matching receptacle. As further illustrated, the modules may each be secured in their corresponding receptacle(s) by fasteners F, which are fastened in the same direction as the direction of insertion, permitting direct access when the cover 110 is removed. As noted herein, the cover 110 is preferably tool-less, having snaps, catches, sliders, or the like to secure it to the chassis, and when the cover 110 is removed, most of the modules are visible and any fasteners may be removed to permit the module to be slid out.

Figure 2A:
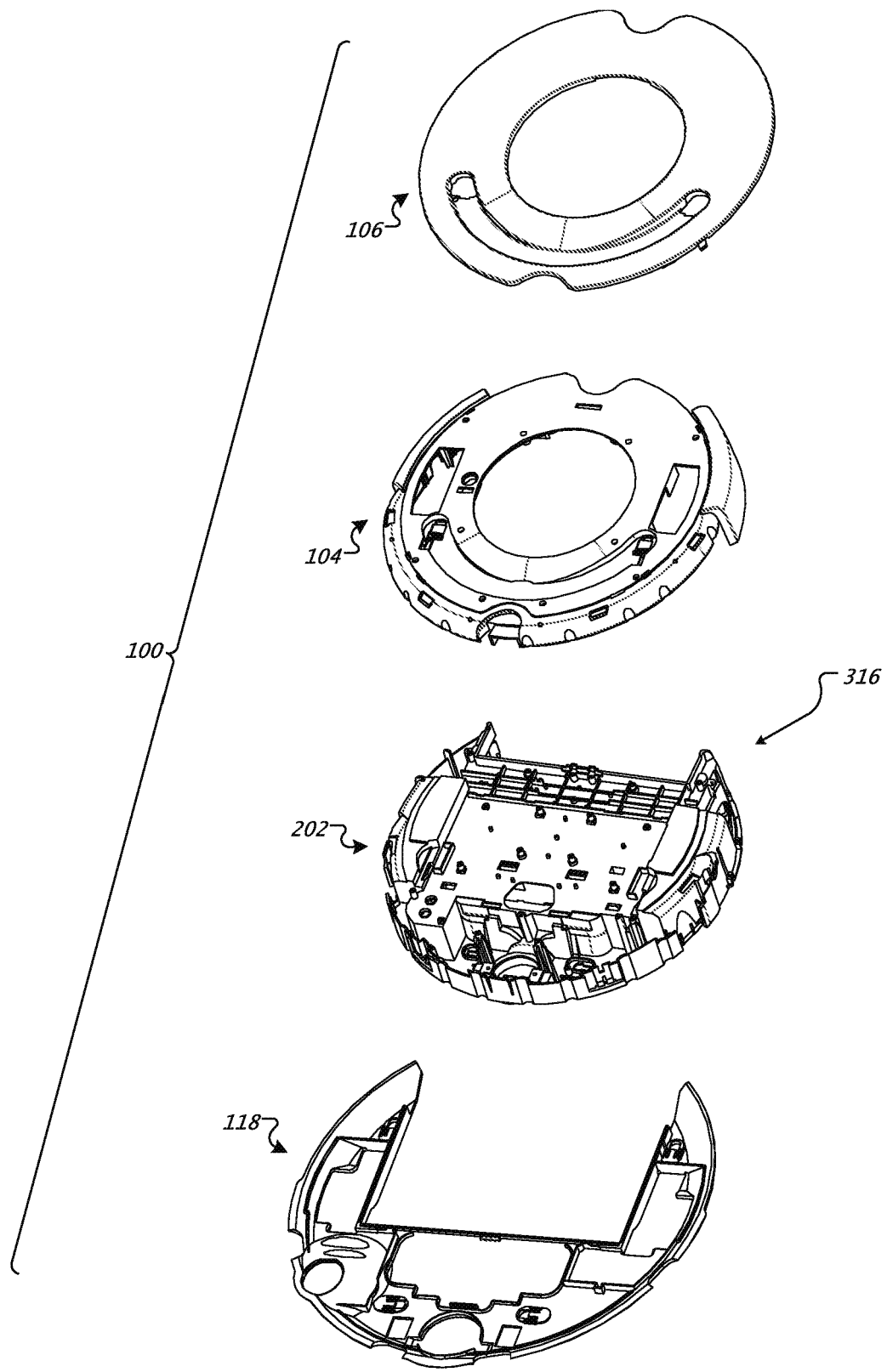
FIGS. 2A and 2B are exploded views showing examples of a chassis, a functional core cover, a top panel, and a retaining cover of a coverage robot.
Figure 2B:
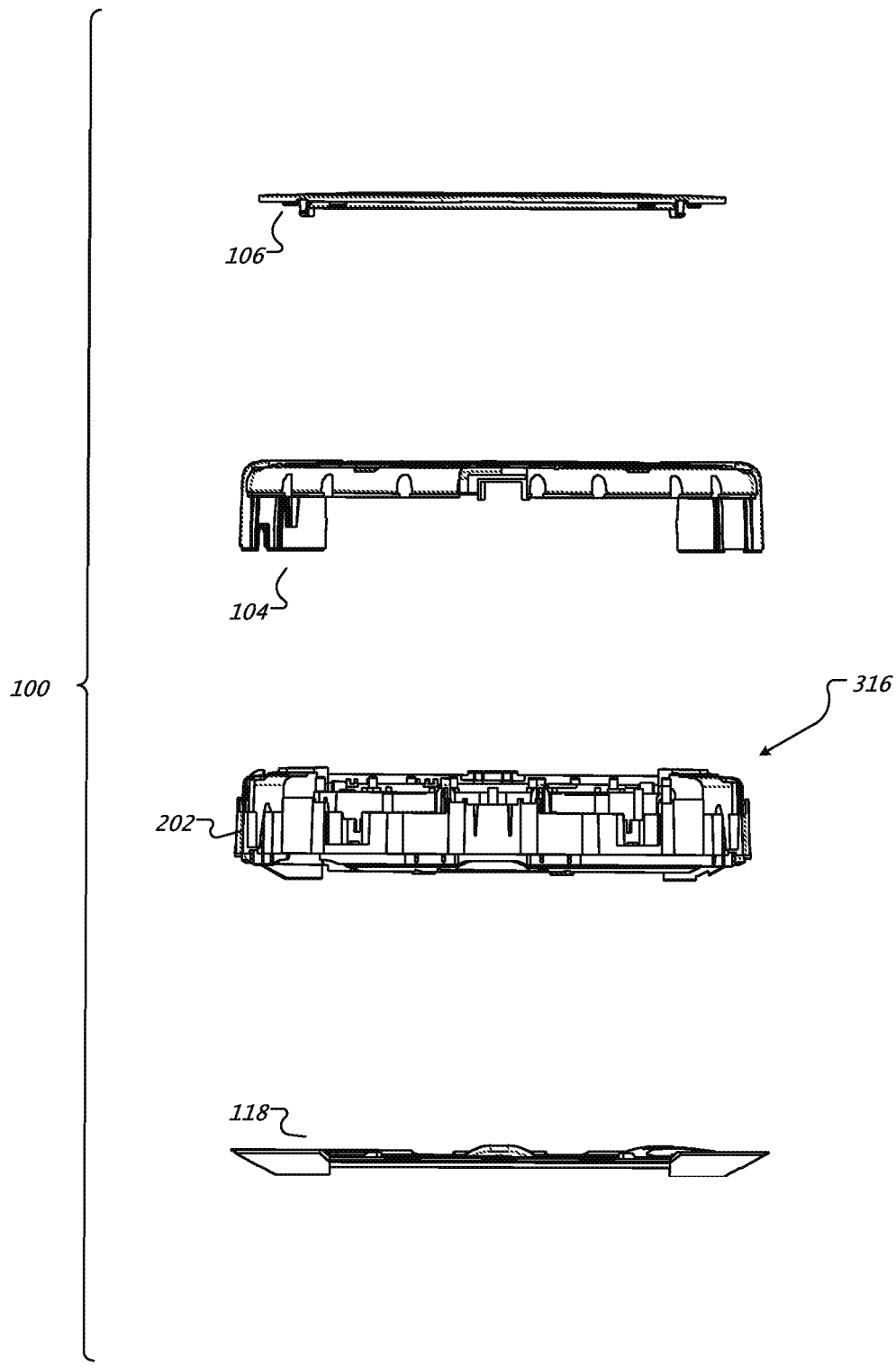
Figure 3:
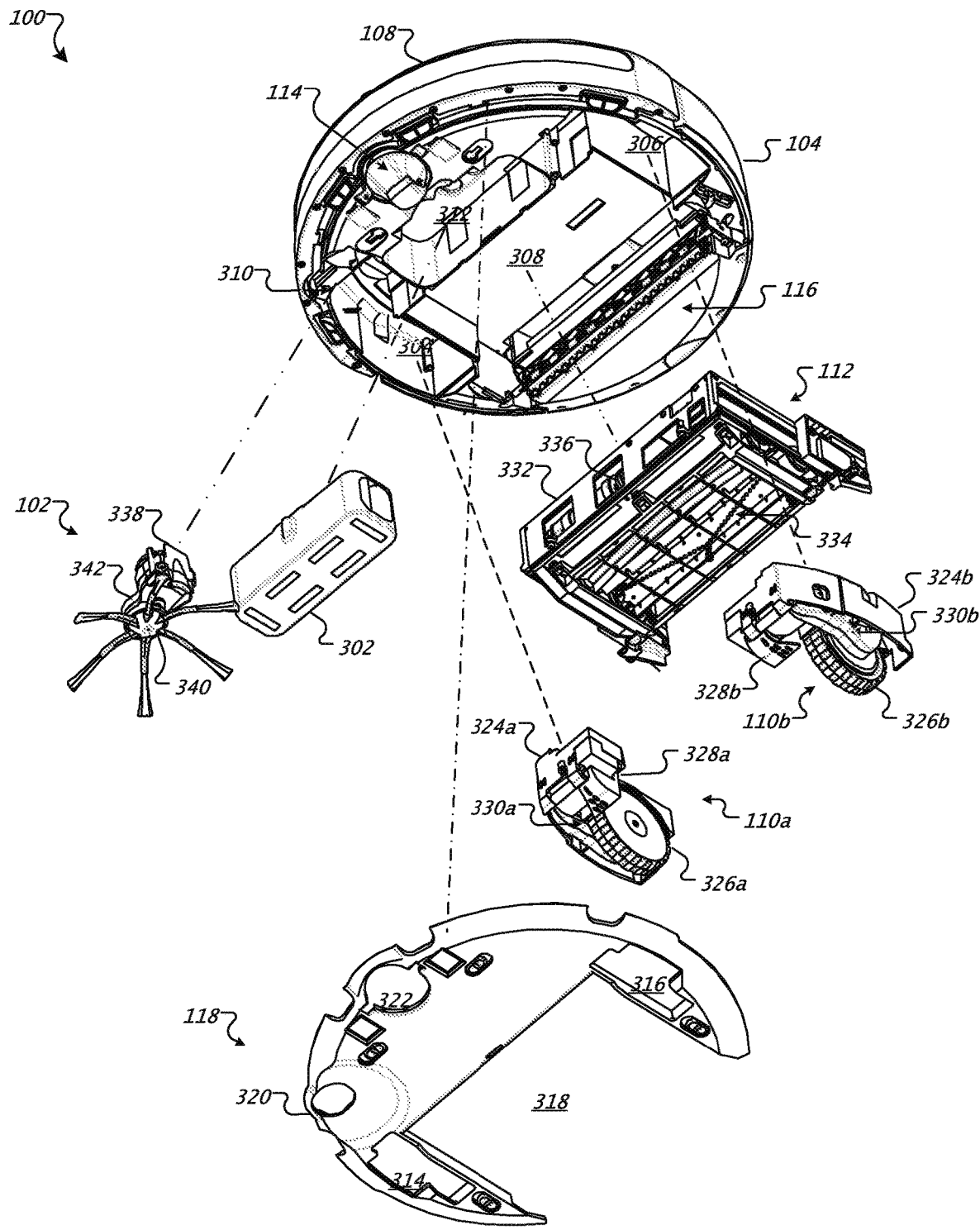
FIG. 3 is an exploded view showing an example of cleaning assemblies, drive wheel assemblies, a battery, and a bottom cover of a coverage robot.

FIGS. 2A-B provide exploded views showing an example of a chassis 202, a functional shell 104, and the covers 106, and 118 of the coverage robot 100. The chassis 202 carries the cleaning assemblies 102 and 112, the drive wheel assemblies 110a-b, and the caster wheel assembly 114 as well as other components of the coverage robot 100. The chassis 202 includes receptacles where the components are secured by the bottom cover 118. In one implementation, the chassis 202 is a unibody construction that defines each receptacle for each module and includes points of contact for parts. In this regard, as noted, the chassis 202 may be formed by wholly or partially unibody or monocoque techniques, in which structural load is supported using the chassis's external skin ("structural skin"). The chassis 202 and top functional shell 104 may enclose electronics such as controller board 1050 to be hermetically sealed or waterproofed and may be rigidly secured together to form a two-part monocoque structural support. Modules as discussed herein may be supported by the structural skin, but may also be formed as members of the monocoque, and/or may have an outer monocoque themselves permitting a module slid into its shaped receiving cavity and secured to contribute to the structural rigidity of the robot. On the other hand, the covers 106 and 118 would not generally contribute significantly to the structural rigidity of the robot (although each could be modified to do so). FIG. 3 is an exploded view showing an example of the cleaning assemblies 102 and 112, the drive wheel assemblies 110a-b, an electric battery 302, and the bottom cover 118 of the coverage robot 100. The bottom cover 118 retains the battery 302, acts as a barrier to prevent infiltration of foreign matter into the robot 100, and provides an insulating barrier for hot surfaces. Referring to FIGS. 1C-F and FIG. 3, the chassis 202 defines shaped receiving receptacles 304, 306, 308, 310, and 312 where the drive wheel assembly 110a, the drive wheel assembly 110b, the cleaning assembly 112, the cleaning assembly 102, and the electric battery 302 are received (by sliding parallel walls of the module into the parallel walls of the mating shaped receiving receptacle) and secured by the bottom cover 118, respectively. The bottom cover 118 includes openings 314, 316, 318, 320, and 322 that are e.g., smaller than downward-facing openings of corresponding shaped receiving receptacles to allow the drive wheel assembly 110a, the drive wheel assembly 110b, the cleaning assembly 112, the cleaning assembly 102, and the caster wheel assembly 102, respectively, to act through the bottom cover, and in some cases, to come in contact with the work surface.

The modularity of the bottom cover 118 allows the robot 100 to be altered to accommodate different floor surfaces. The bottom cover 118 may be disposed on the chassis 202 at various cover heights with respect to a floor to accommodate different floor types. For high pile shag carpets, the bottom cover 118 may be coated with Teflon and the cover height reduced, to allow the robot 100 to skim (float) on the deep carpet with ease. Where the floor surface is primarily hard flooring, a replaceable bottom covers 118 with mustache brushes disposed on a forward portion of the bottom cover 118 may be used to channel fine dirt towards the cleaning assembly 112. Additional mustache brushes disposed on a rearward portion of the bottom cover 118 may be used to minimize air born dust from escaping the cleaning assembly 112. When using the robot 100 to clean surfaces with many drop-offs (ledges/stairs), the bottom cover 118 may be fitted with skid pads that act as a braking system to prevent the robot 100 from falling or sliding off the ledges. In another implementation, a UV light module that works in close proximity to the floor to sanitize floors is disposed below the bottom cover 118, which is fitted with electric terminals to contact the power contacts of one of the cleaning assemblies 102 or 112. In yet another implementation, the bottom cover 118 is fitted with sand-paper flaps for prepping a factory/lab floor in need of abrasive floor cleaning before a paint layer can be applied.

The drive wheel assembly module 110a-b includes drive wheel assembly housings 324a-b, wheels 326a-b, wheel drive motors 328a-b, and linkages 330a-b, respectively. The wheels 326a-b are rotatably coupled to the drive wheel assembly housings 324a-b. In addition, the drive wheel assembly housings 324a-b carry the wheel drive motors 328a-b, respectively. The wheel drive motors 328a-b are operable to drive the wheels 326a-b, respectively. The linkages 330a-b attach the drive wheel assemblies 110a-b, respectively, to the chassis 202 at a location forward of the wheels 326a-b, respectively. The linkages 330a-b suspend the wheels 326a-b, respectively, from the chassis 202. The linkages 330a-b rotate at the connection to the chassis 202 to allow the wheels 326a-b, respectively, to move up and down.

The main cleaning assembly module 112 includes a cleaning assembly housing 332, a main brush 334, a secondary brush, and a cleaning drive motor 336. The main brush 334, the secondary brush, a pivoting frame, a wire cover or bail, and other elements moving together with the brushes to accommodate surface variations form a main cleaning head. The main brush 334 is rotatably coupled to the cleaning assembly housing 332 and rotates to brush and clean the work surface. The cleaning assembly housing 332 carries a cleaning drive motor 336. The cleaning drive motor 336 drives the main brush 334 and optionally a secondary brush. This main cleaning assembly module 112, as depicted, includes the main work head of the robot 100 (i.e., that works and covers an area as the robot moves forward), and the main work head the main work width of the robot 100.

The lateral or side cleaning assembly module or head 102 includes a cleaning assembly housing 338, a side brush 340, and a cleaning drive motor 342. The side brush 340 is rotatably coupled to the cleaning assembly housing 338 and rotates to brush and clean the work surface, the side brush 340 extending beyond the perimeter of the robot to collect debris along walls and in corners and direct debris in front of the main brush 334, to be collected by the main brush. The cleaning assembly housing 338 carries the cleaning drive motor 342. The cleaning drive motor 342 drives the side brush 340.

The electric battery 302 provides power to components, such as the drive wheel assemblies 110a-b and the cleaning assemblies 102 and 112, via motor controllers and amplifiers. The drive wheel modules 110a-b and the cleaning modules 102 and 112 include power connectors that connect motor power and/or control to the wheel drive motors 328a-b and the cleaning drive motors 336 and 342, respectively. The power connectors are located on an outer surface of the drive wheel assembly housings 324a-b and the cleaning assembly housings 332 and 338. The power connectors mate with power connectors within the receptacles 304, 306, 308, 310, and 312 in the chassis 202.

Figure 4A:
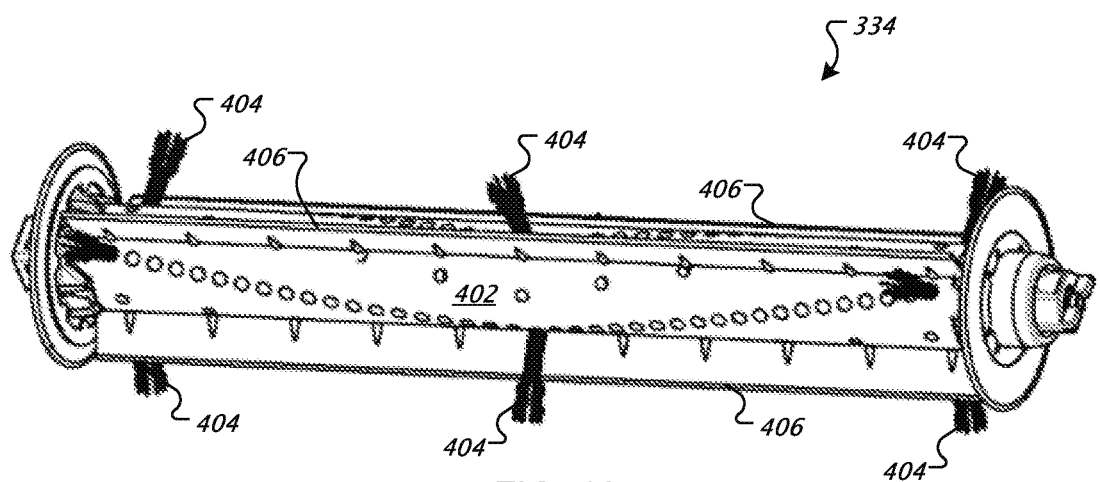
FIG. 4A is a perspective view showing an example of a horizontal cleaning head.

FIG. 4A is a perspective view showing an example of a main brush 334. The main brush 334 is separately and independently removable from the cleaning head within the cleaning assembly 112 and thereby from the coverage robot 100. The main brush 334, in this case, rotates about a horizontal axis parallel to the work surface, and is thereby a horizontal cleaning assembly although the main work width of a coverage robot may include vertically rotating brushes, no brushes in lieu of a vacuum, a reciprocating brush, a circulating belt member, and other known cleaning implements. The main brush 334 has a cylindrical body 402 that defines a longitudinal axis of rotation. Bristles 404 are attached radially to the cylindrical body 402. Flexible flaps 406 are attached longitudinally along the cylindrical body 402. As they rotate, the bristles 404 and the flexible flaps 406 move debris on the work surface, directing it toward a sweeper bin in the robot. In some cases, the main brush may also direct debris or dirt a suction path under the cleaning robot 100. In the case of a wet cleaning robot, the main brush may have instead a scrubbing function, and a vacuum or other collector may collect waste fluid after scrubbing.

Figure 4B:
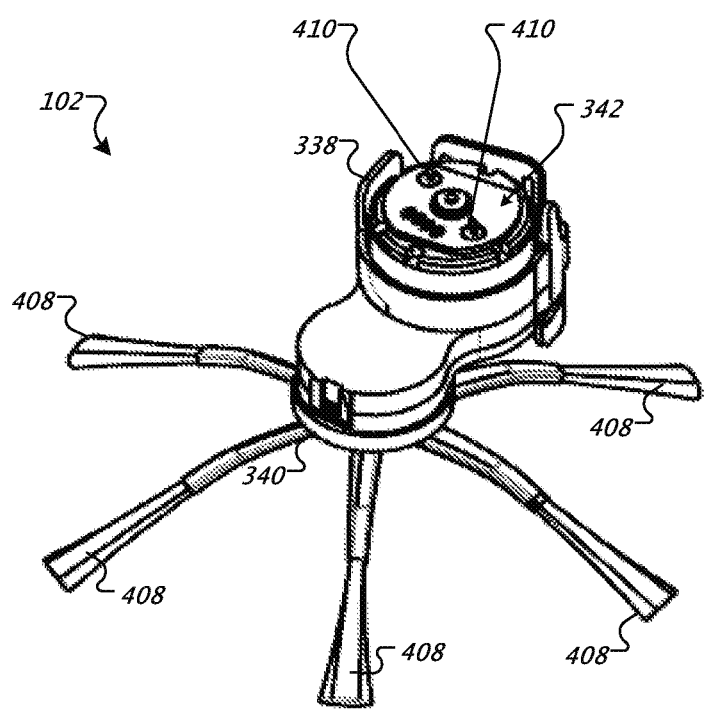
FIG. 4B is a perspective view showing an example of a vertical cleaning assembly.
Figure 4C:
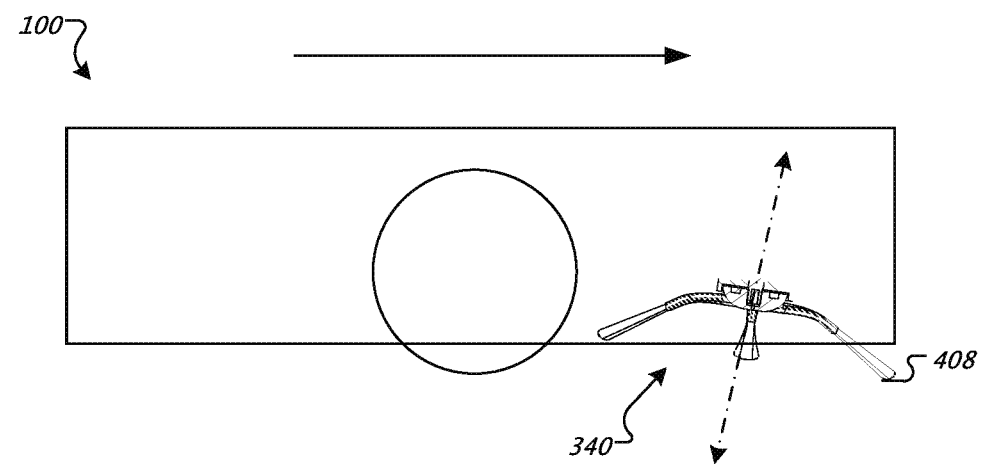
FIG. 4C is a schematic view showing an example of a vertical cleaning assembly.
Figure 4C:
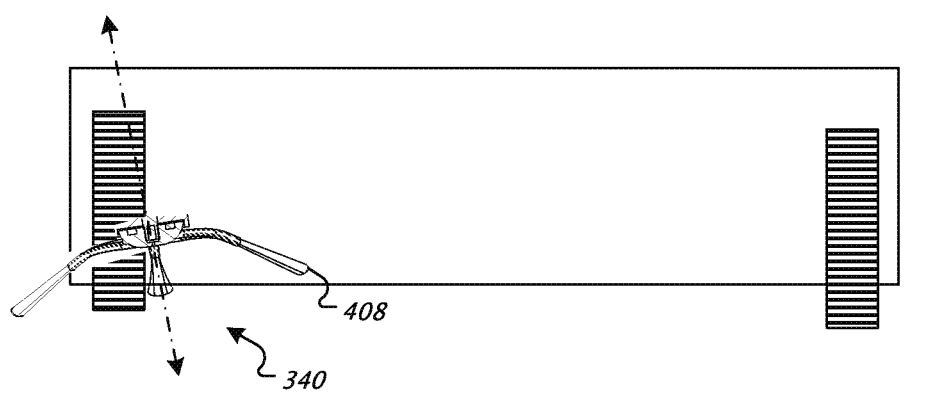

FIG. 4B is a perspective view showing an example of the side cleaning assembly 102, which may be a vertical cleaning assembly. In certain implementations, the cleaning head 340 is separately and independently removable from the cleaning assembly 102 and the cleaning robot 100. The side cleaning brush 340 rotates about a vertical axis normal to the work surface. The cleaning brush 340 has brush elements 408 with a first end that attaches to the cleaning head 340 at the axis of rotation and a second end that radiates from the axis of rotation. In certain implementations, adjacent brush elements are evenly spaced about the axis of the cleaning head 340, such as a space of 120 degrees between three elements or 60 degrees between six elements. The brush elements 408 extend beyond a peripheral edge of the coverage robot 100 to move debris adjacent to the coverage robot 100 toward the suction path under the coverage robot 100. In some implementations, although the vertical cleaning assembly 102 is generally vertical, the cleaning head 340 operates about an axis offset (tilted) from a vertical axis of the vertical cleaning assembly 102. As shown in schematic form in FIG. 4C, the brush 340 may be tilted, in both forward and side to side directions (i.e., tilted downward with respect to the plane of wheel contact about a line about 45 degrees from the direction of travel within that plane), in order to collect debris from outside the robot's periphery toward the main work width, but not disturb such collected debris once it is there or otherwise eject debris from the work width of the robot. The axis offset is optionally adjustable to customize the tilt of the cleaning head 340 to suit various carpet types, such as shag.

Referring to FIGS. 4B and 1D, the side cleaning module 102 includes a power connector 410. When the cleaning assembly 102 is placed in the shaped receptacle 310 the power connector 410 mates with a power connector 210 in the receptacle 310 (as described, optionally having shaped parallel walls to guide the power connectors to mate). The mated power connector 410 provides power to the cleaning drive motor 342 from the electric battery 302. A mechanical hard point or fastener 411 on the side cleaning module 102 mates with a corresponding mechanical hard point 211 in the receptacle 310.

Figure 5:
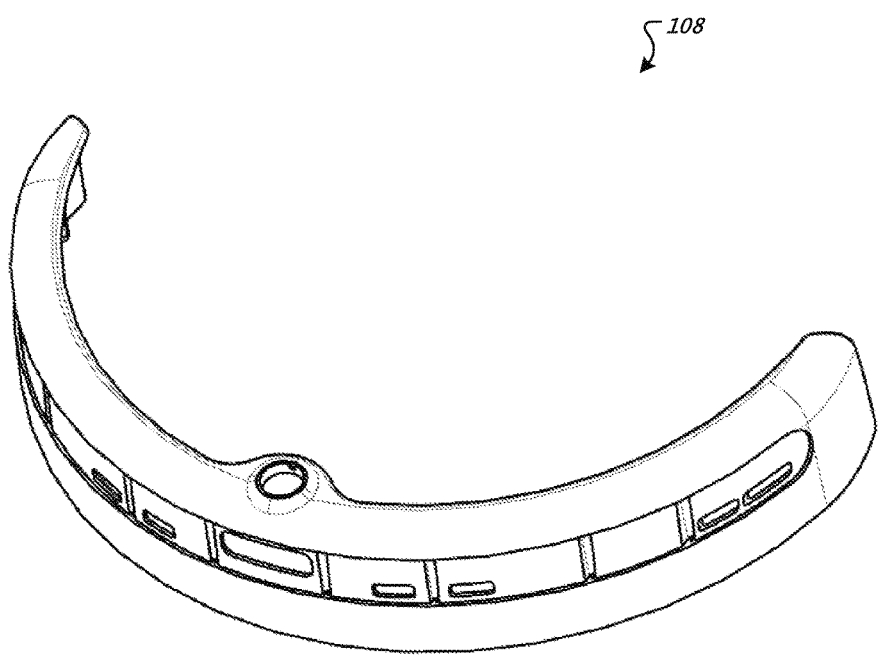
FIG. 5 is a perspective view showing an example of a coverage robot bumper.

FIG. 5 is a perspective view showing an example of the coverage robot bumper 108. The bumper 108 is attached to the coverage robot 100 at a forward portion of the chassis 202. The bumper 108 is separately and independently removable from the chassis 202 and the coverage robot 100. The bumper 108 protects the coverage robot 100 and one or more objects in the path of the coverage robot 100 during a collision with the one or more objects.

Figure 6:
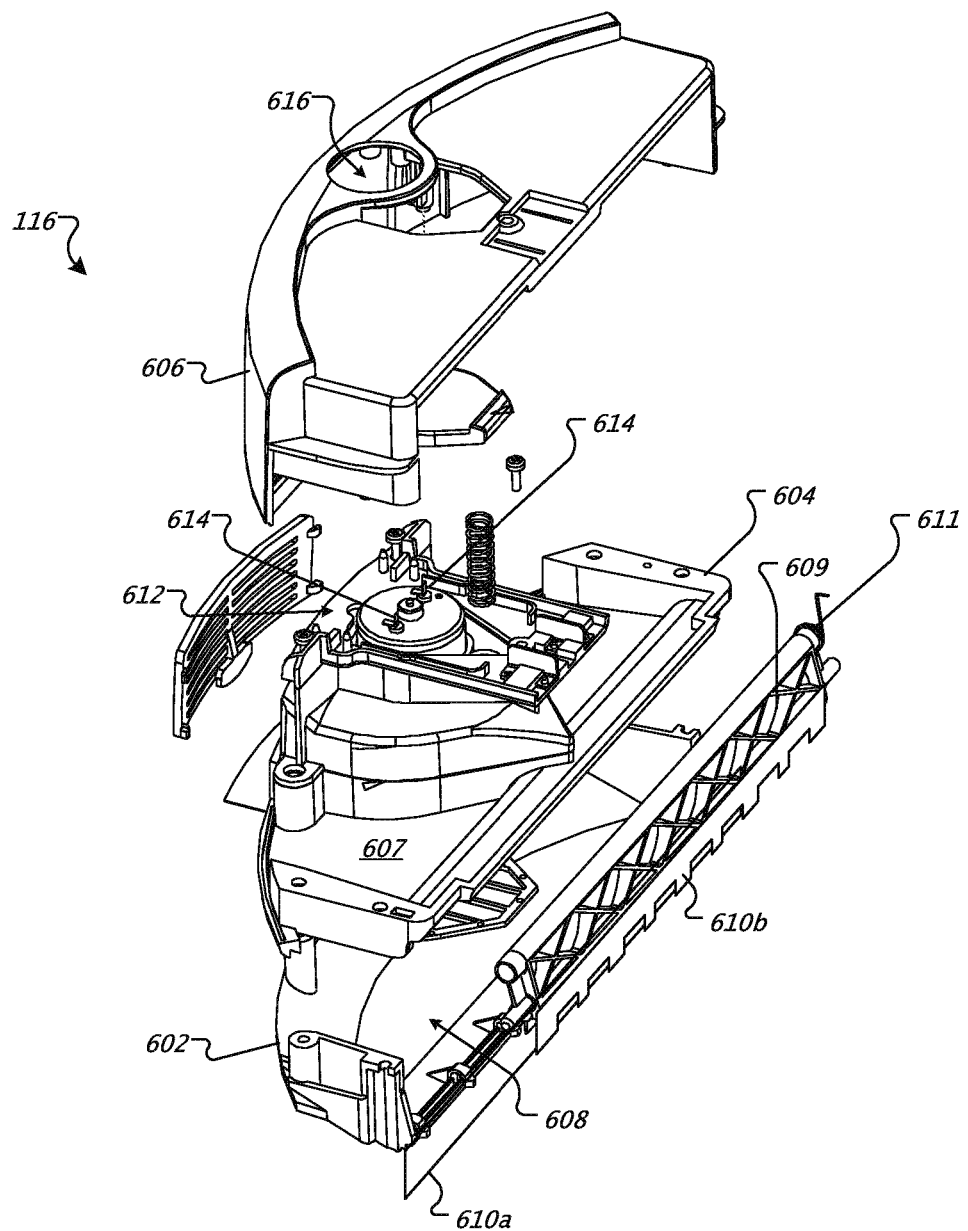
FIG. 6 is an exploded view showing an example of a cleaning bin.

FIG. 6 is an exploded view showing an example of the cleaning bin 116. The cleaning bin 116 includes a bottom housing 602, a middle housing 604, a top housing 606, a debris cavity 607, a filter cavity 608, a filter cavity cover 609, a debris squeegee 610, and a vacuum fan 612. Referring to FIG. 2, chassis 202 defines a bin receiving slot 316 where the cleaning bin 116 is housed.

Together, the top housing 606 and the middle housing 604 form a debris cavity 607. The debris cavity 607 has at least one opening at its forward side adjacent to the cleaning assembly 112. Through the opening(s), the debris cavity 607 may collect debris from the cleaning assembly 112.

Together, the bottom housing 602 and the middle housing 604 may also form a filter cavity 608 that stores debris vacuumed from the work surface. The debris squeegee 610 scrubs the work surface and directs debris into the debris cavity 608. The vacuum fan 612 is attached to the top side of the middle housing 604. The vacuum fan 612 creates a suction path from the work surface at the debris squeegee 610 and through the filter cavity 608. A filter below the vacuum fan 612 prevents debris from exiting the filter cavity 608 and entering the vacuum fan 612.

The filter cavity cover 609 is rotatably attached to the middle housing 604 and is configured to move between a closed position and an open position, which exposes the filter cavity 608 and a filter for servicing.

The cleaning bin 116 may also include a filter cavity cover spring actuator 611 that biases the filter cavity cover 609 in the open position. When the cleaning bin 116 is secured to the chassis 202 the filter cavity cover 609 is held in a closed position. When the filter cavity cover 609 is removed from the chassis 202, the filter cavity cover spring 611 rotates the filter cavity cover 609 open, exposing the filter cavity 608 for removal of debris. In one example, the cleaning bin 116 may also include a latch to hold the biased filter cavity cover 609 in the closed position, until a user releases the latch, thereby allowing the filter cavity cover spring 611 to rotate the cover open.

The vacuum fan 612 includes a power connector 614. The power connector 614 provides power to the vacuum fan 612 from the electric battery 302. The power connector 614 protrudes through an opening 616 in the top housing 606. This allows the power connector 614 to mate with a power connector in the chassis 202 when the cleaning bin 116 is placed in a receptacle within the chassis 202.

Figure 7A:
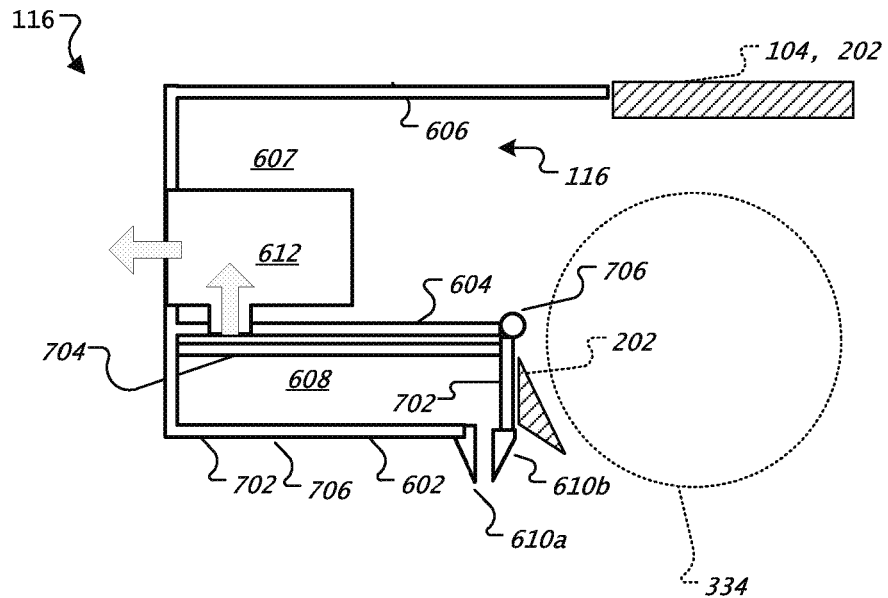
FIGS. 7A-B are cross-sectional views showing examples of cleaning bins including cleaning bin covers.
Figure 7B:
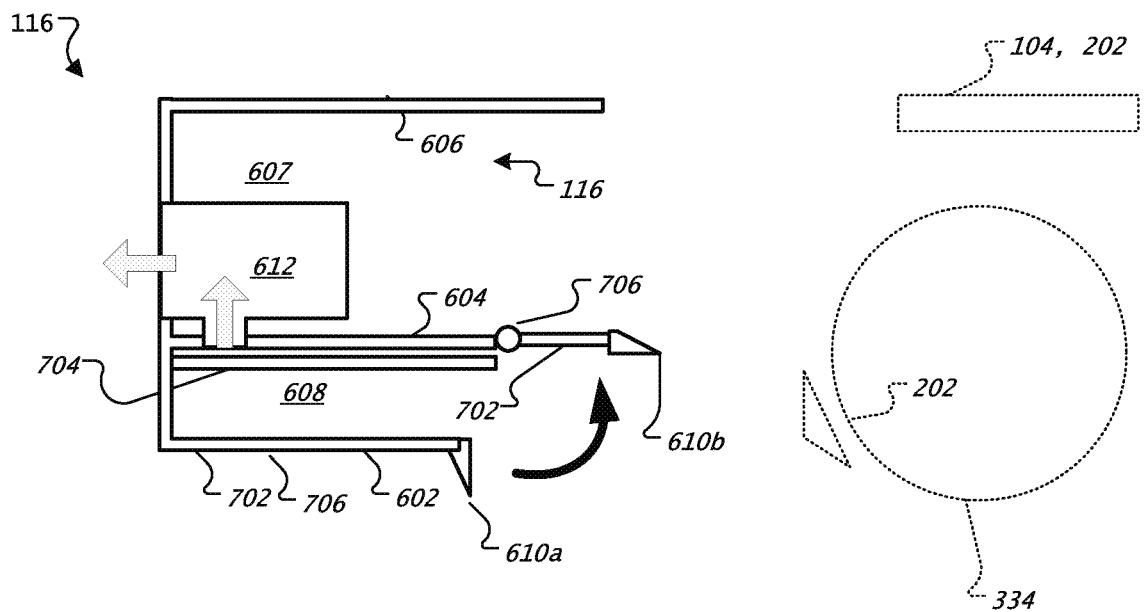

FIGS. 7A-B are cross-sectional views showing examples of the cleaning bin 116 including cleaning bin covers. FIG. 7A shows an example of the cleaning bin 116 having a cleaning bin cover 702 hinged at the bin housing 606. The bin cover 702 enclose a robot side of the filter bin 116. The bin cover 702 may be opened to empty the cleaning bin 116, and in particular, the debris the filter cavity 608. A bin filter 704 below the vacuum fan 612 retains debris vacuumed into the filter cavity 608 along the suction path. The bin covers 702 may have attached springs 706 or another device that bias the bin covers 702 in an open position.

In certain implementations, the bin covers 702 open as the cleaning bin 116 is removed from the coverage robot 100 (as shown in FIGS. 7A, 7B).

Alternatively, the bin cover 702 may open when a bin cover latch is released. The latch retains the bin cover 702 in a closed position, such as during operation of the coverage robot 100. The latch may be released to open the bin cover 702 and empty the cleaning bin 116.

Figure 8:
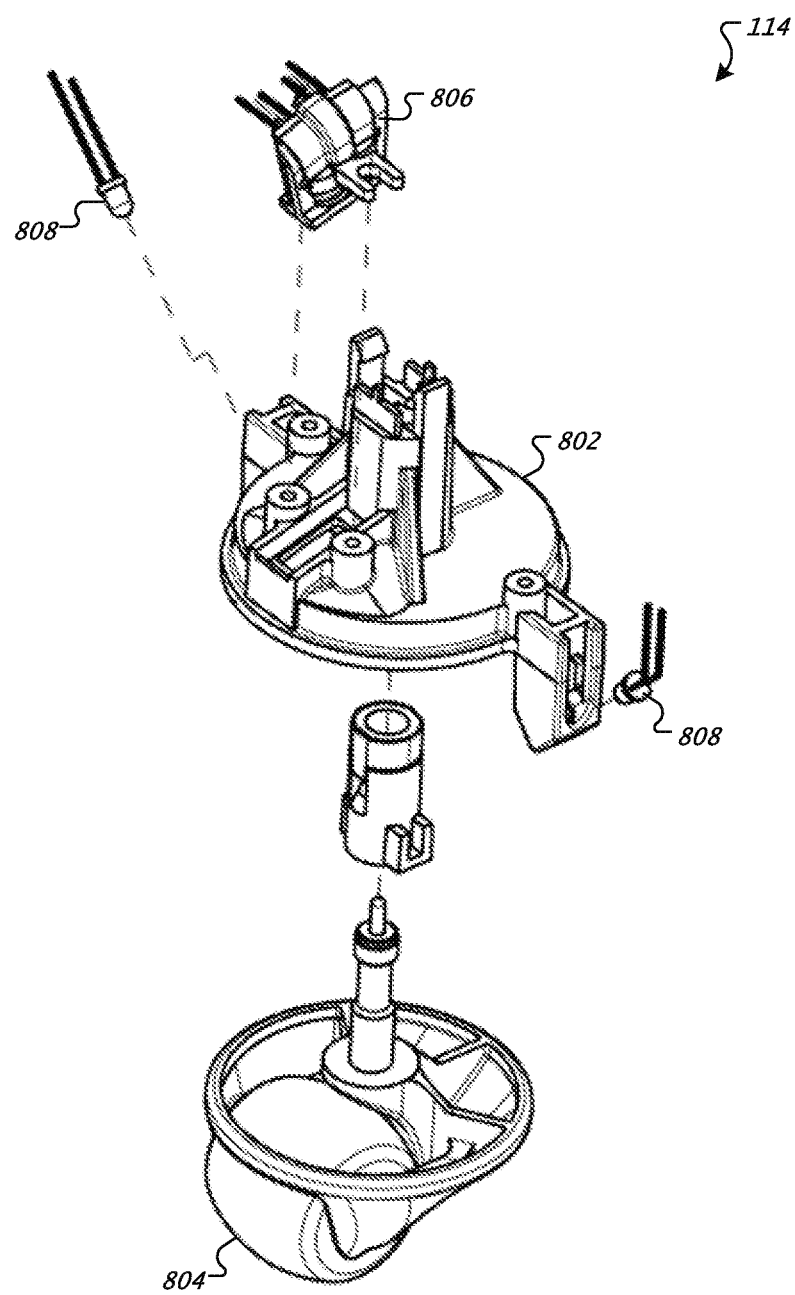
FIG. 8 is an exploded view showing an example of a caster wheel assembly.

FIG. 8 is an exploded view showing an example of the caster wheel assembly 114. The caster wheel assembly 114 is separately and independently removable from the chassis 202 and the coverage robot 100. The caster wheel assembly 114 includes a caster wheel housing 802, a caster wheel 804, a wheel-drop sensor 806, and a wheel-floor proximity sensor 808.

The caster wheel housing 804 carries the caster wheel 802, the wheel drop sensor 806, and wheel-floor proximity sensor 808. The caster wheel 804 turns about a vertical axis and rolls about a horizontal axis in the caster wheel housing 802.

The wheel drop sensor 806 detects downward displacement of the caster wheel 804 with respect to the chassis 202. The wheel drop sensor 806 determines if the caster wheel 804 is in contact with the work surface.

The wheel-floor proximity sensor 808 is housed adjacent to the caster wheel 804. The wheel-floor proximity sensor 808 detects the proximity of the floor relative to the chassis 202. The wheel-floor proximity sensor 808 includes an infrared (IR) emitter and an IR receiver. The IR emitter produces an IR signal. The IR signal reflects off of the work surface. The IR receiver detects the reflected IR signal and determines the proximity of the work surface. Alternatively, the wheel-floor proximity sensor 808 may use another type of sensor, such as a visible light sensor. The wheel-floor proximity sensor 808 prevents the coverage robot 100 from moving down a cliff in the work surface, such as a stair step or a ledge. In certain implementations, the drive wheel assemblies 110a-b each include a wheel-floor proximity sensor.

Figure 9A:
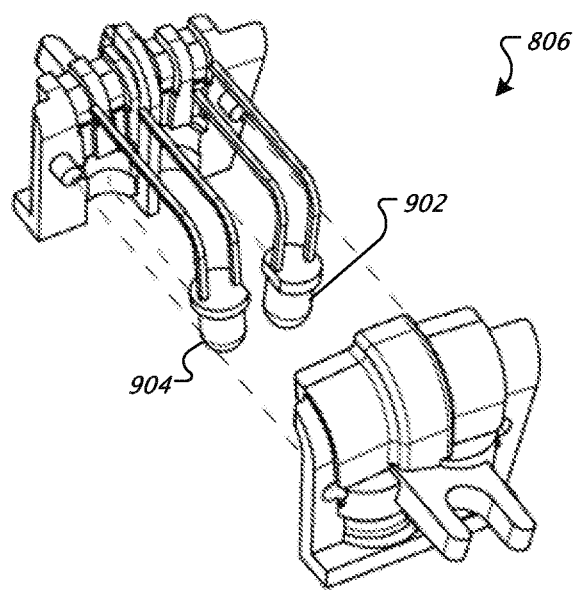
FIG. 9A is an exploded view showing an example of a wheel-drop sensor.

FIG. 9A is an exploded view showing an example of the wheel-drop sensor 806. The wheel drop sensor 806 includes an IR emitter 902 and an IR receiver 904. The IR emitter 902 produces an IR signal. The IR signal reflects from the caster wheel 804. The IR receiver 904 detects the reflected IR signal and determines the vertical position of the caster wheel 804.

Figure 9B:
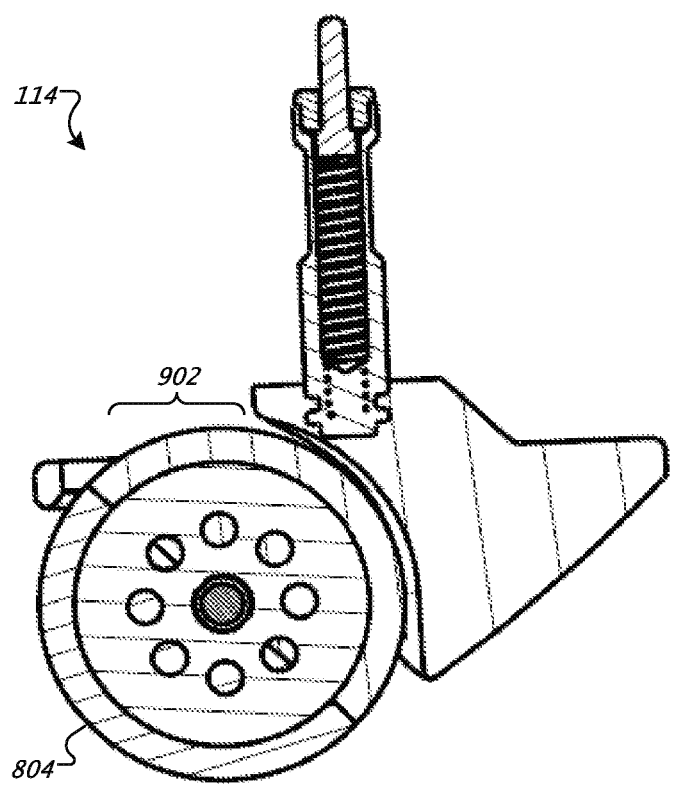
FIG. 9B is a cross-sectional view showing an example of a caster wheel assembly.

FIG. 9B is a cross-sectional view showing an example of the caster wheel assembly 114. The view shows a top surface 906 of the caster wheel 804 from which the IR signal reflects. The IR receiver 904 uses the reflected IR signal to determine the vertical position of the caster wheel 804.

Figure 10A:
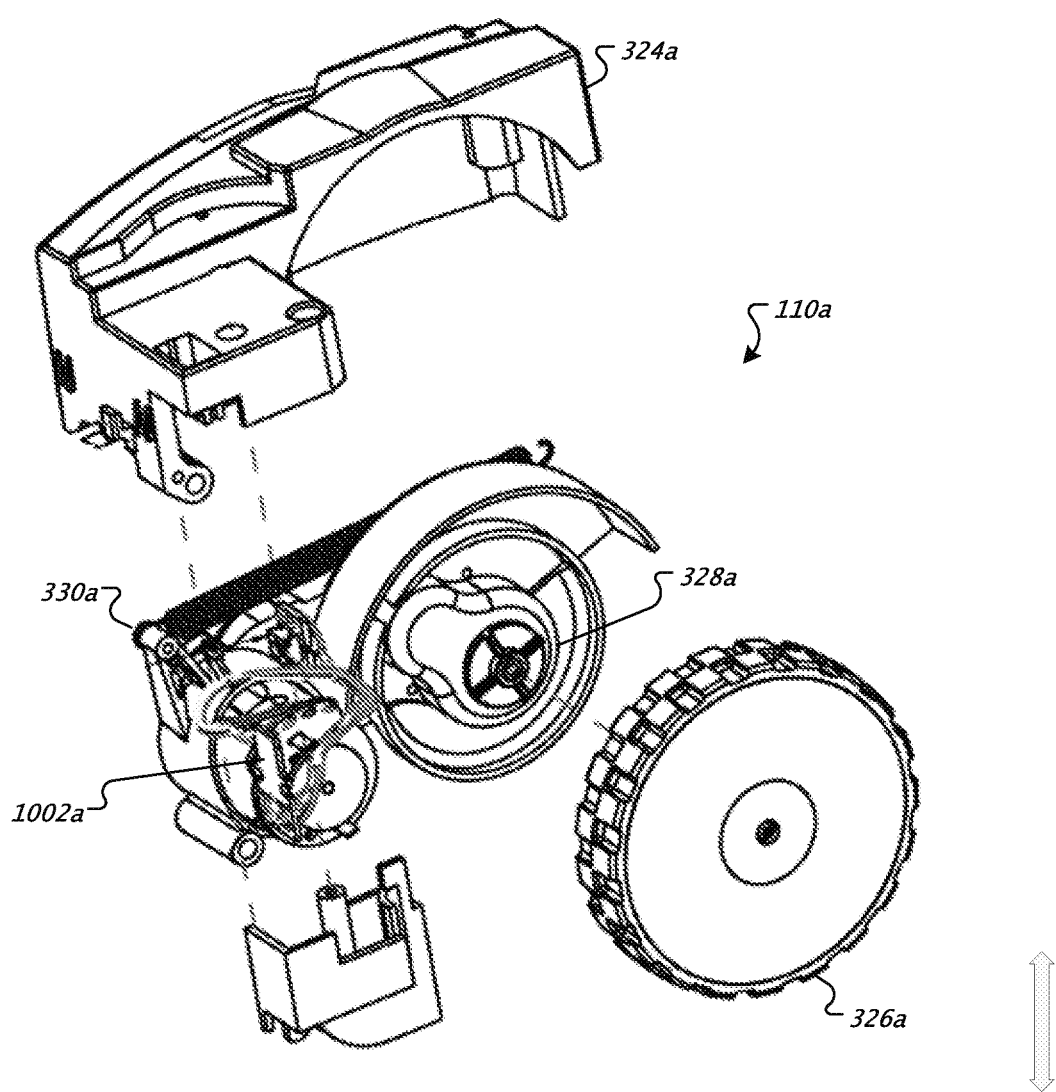
FIG. 10A is an exploded view from a top perspective showing an example of a drive wheel assembly.
Figure 10B:
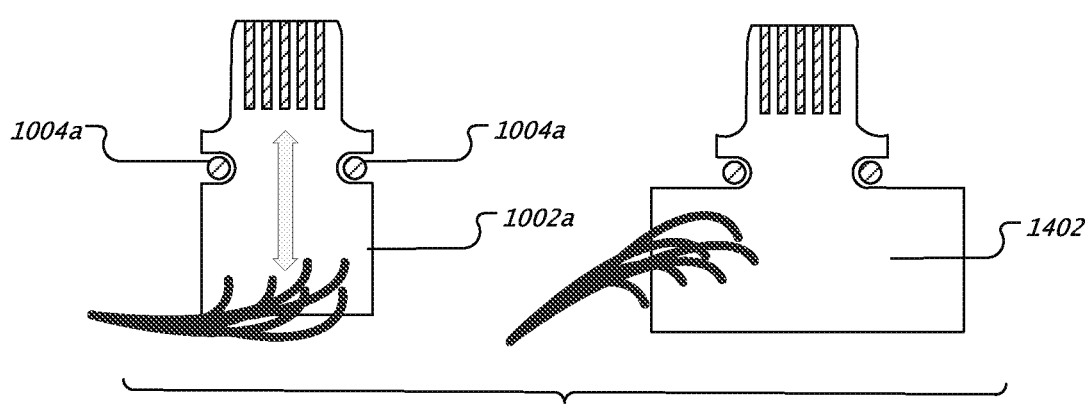
FIG. 10B is a front view of a power connector.
Figure 11:
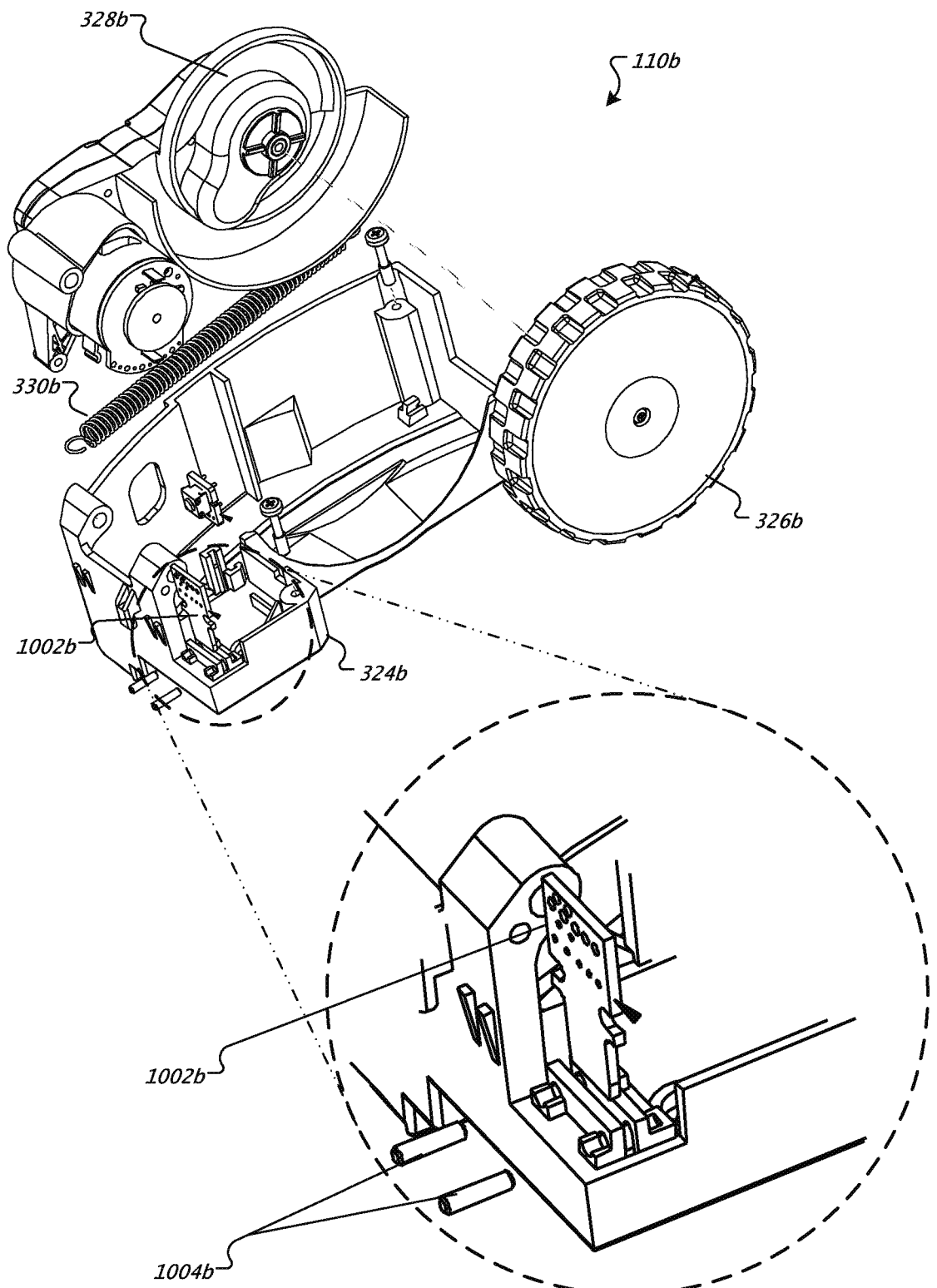
FIG. 11 is an exploded view from a bottom perspective showing an example of a drive wheel assembly.

FIG. 10A is an exploded view from a top perspective showing an example of the drive wheel assembly 110a. The view shows the drive wheel assembly housing 324a, the wheel drive motor 328a, the linkage 330a, the wheel 326a, and the power connector 1002. FIG. 11 is an exploded view from a bottom perspective showing an example of the drive wheel assembly 110b. The view shows the drive wheel assembly housing 324b, the wheel drive motor 328b, the linkage 330b, the wheel 326b and the power connector 1002b.

Referring to FIGS. 10A-B, 11, and 1C, the drive wheel assembly 110a also includes a power connector 1002. When the drive wheel assembly 110a is placed in the receptacle 304, the power connector 1002a mates with a power connector 204 in the receptacle 304. This allows the power connector 1002a to provide power to the wheel drive motor 328a from the electric battery 302. A mechanical hard point 1003a on the drive wheel assembly 110a mates with a corresponding mechanical hard point 205 in the receptacle 304. The power connector 1002a on the drive wheel assembly 110a is a floating connector (edge card) mounted to the module housing 324a with pins/screws 1004 with a clearance between the pins 1004, power connector 1002a, and the walls of the module housing 324a. The limited free-float design allows the power connector 1002a to move a small amount when the locating features, such as the mechanical hard point 1003a, in the module are engaged, thereby minimizing stress on the connector-set during assembly and in operation.

Figure 12:
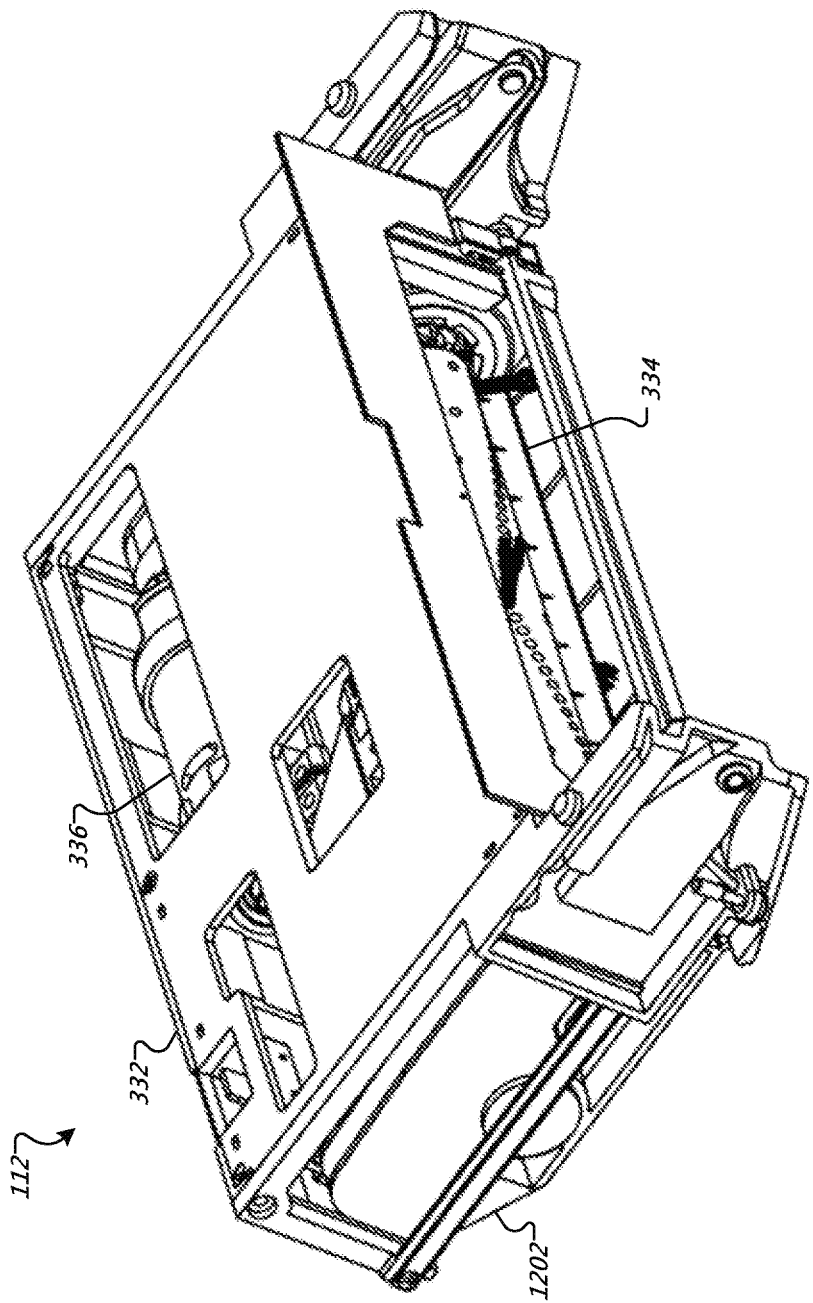
FIG. 12 is a perspective view showing an example of a cleaning assembly.

FIG. 12 is a perspective view showing an example of the cleaning module 112 (or coverage or work module, for implementations that do not "clean". Within the cleaning module 112, the cleaning module housing 332 carries a cleaning head assembly 1202. The cleaning head assembly 1202 may be movable with respect to the cleaning assembly housing 332 and the coverage robot 100. The cleaning head assembly 1202 carries the main cleaning brush 334 and the cleaning drive motor 336 (as can be seen, although a multiplicity of bristle groups are provided on the brush 334, only a few are depicted for clarity).

Figure 13:
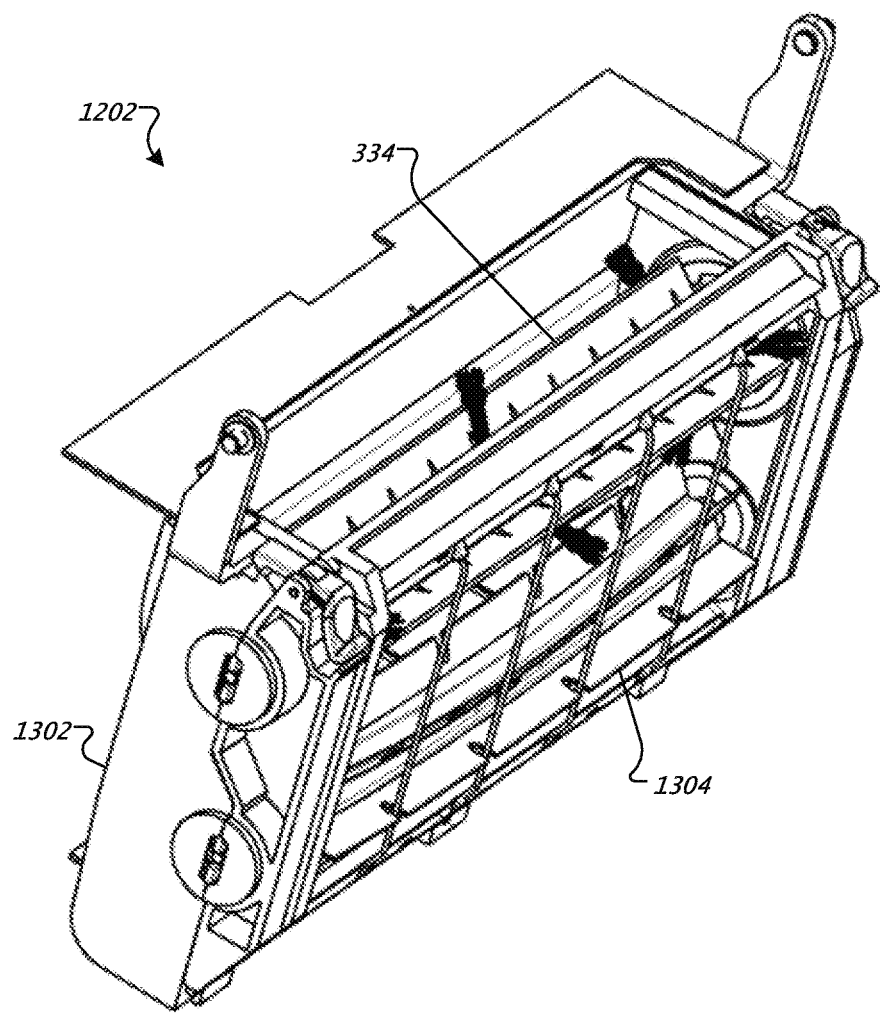
FIG. 13 is a bottom perspective view showing an example of a cleaning head assembly.

FIG. 13 is a bottom perspective view showing an example of the cleaning head assembly 1202. The cleaning head assembly 1202 includes a cleaning head assembly housing 1302. The cleaning head assembly housing 1302 carries the main cleaning brush 334 and a secondary cleaning brush 1304.

The main cleaning brush 1304 is rotatably coupled to the cleaning head assembly housing 1302. The secondary cleaning brush 1304 includes flexible flaps. The secondary brush 1304 rotates in the opposite direction to the main brush 1302, so that debris impelled by the main brush 1304 is caught and directed up and over the secondary brush. In addition, the flexible flaps may brush the work surface clean as the cleaning head 1304 rotates.

Figure 14:
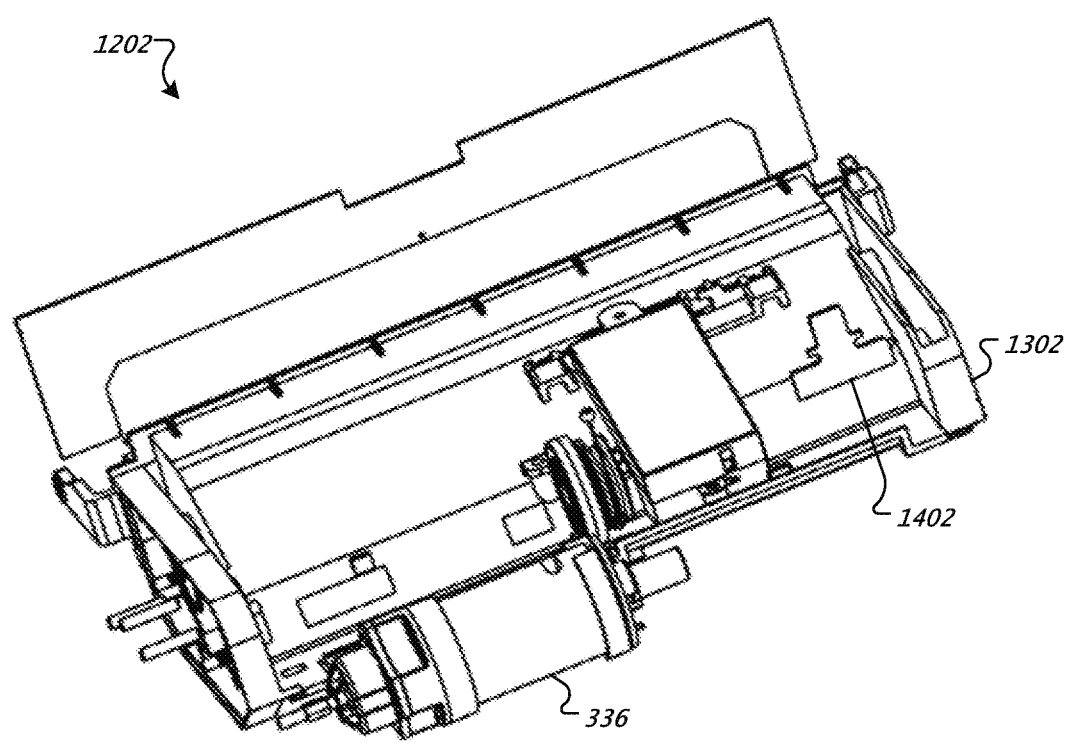
FIG. 14 is a top perspective view showing an example of a cleaning head assembly.

FIG. 14 is a top perspective view showing an example of the cleaning head assembly 1202. The view shows the location of the cleaning drive motor 336 at the back of the cleaning head assembly housing 1302. Referring to FIGS. 14 and 1C, the cleaning head assembly housing 1302 also includes a power connector 1402. The power connector 1402 provides power to the cleaning drive motor 336 from the electric battery 302. The power connector 1402 protrudes through an opening in the cleaning assembly housing 332 when the cleaning head assembly 1202 is placed in the cleaning assembly 112. Similar to the wheel module, the power connector 1402 on the drive wheel assembly 110a is a floating connector (edge card) mounted to the module housing with pins, having a clearance between the pins and a C-shaped receiving slot in the edge card, as well as surrounding the power connector 1402. When the cleaning assembly 112 is placed in the receptacle 308, the power connector 1402 mates with a power connector 208 in the chassis 202 to provide power to the cleaning drive motor 336. Mechanical hard points 1403 on the cleaning assembly 112 mate with corresponding mechanical hard points 209 in the receptacle 308.

In one implementation, referring to FIGS. 1C-D, the power connectors 1002, 1102, 1402, and 410 are tool-less (operable without tools) module-side electrical plugs that mate with corresponding tool-less module-side electrical plugs 204, 206, 208, and 210 on the chassis 202. The power connectors 1002, 1102, 1402, 410 204, 206, 208, and 210 establish an electrical connection between each module (he drive wheel assembly 110a, the drive wheel assembly 110b, the cleaning assembly 112, the cleaning assembly 102, the electric battery 302, and the cleaning bin 116) and a corresponding receptacle 304, 306, 308, 310, 312, and 316, respectively, upon insertion of the module into the receptacle.

Referring to FIGS. 1C-D, chassis 202 defines receptacle 250 in which controller board 1050 is removably mounted. Power connectors 204, 206, 208, and 210 in receptacles 304, 306, 308, and 310 respectively, are electricity connected to the controller board 1050. A display panel 105 is disposed above the chassis 202. The display panel 105 is in electrical communication with the controller board 1050.

Figure 15:
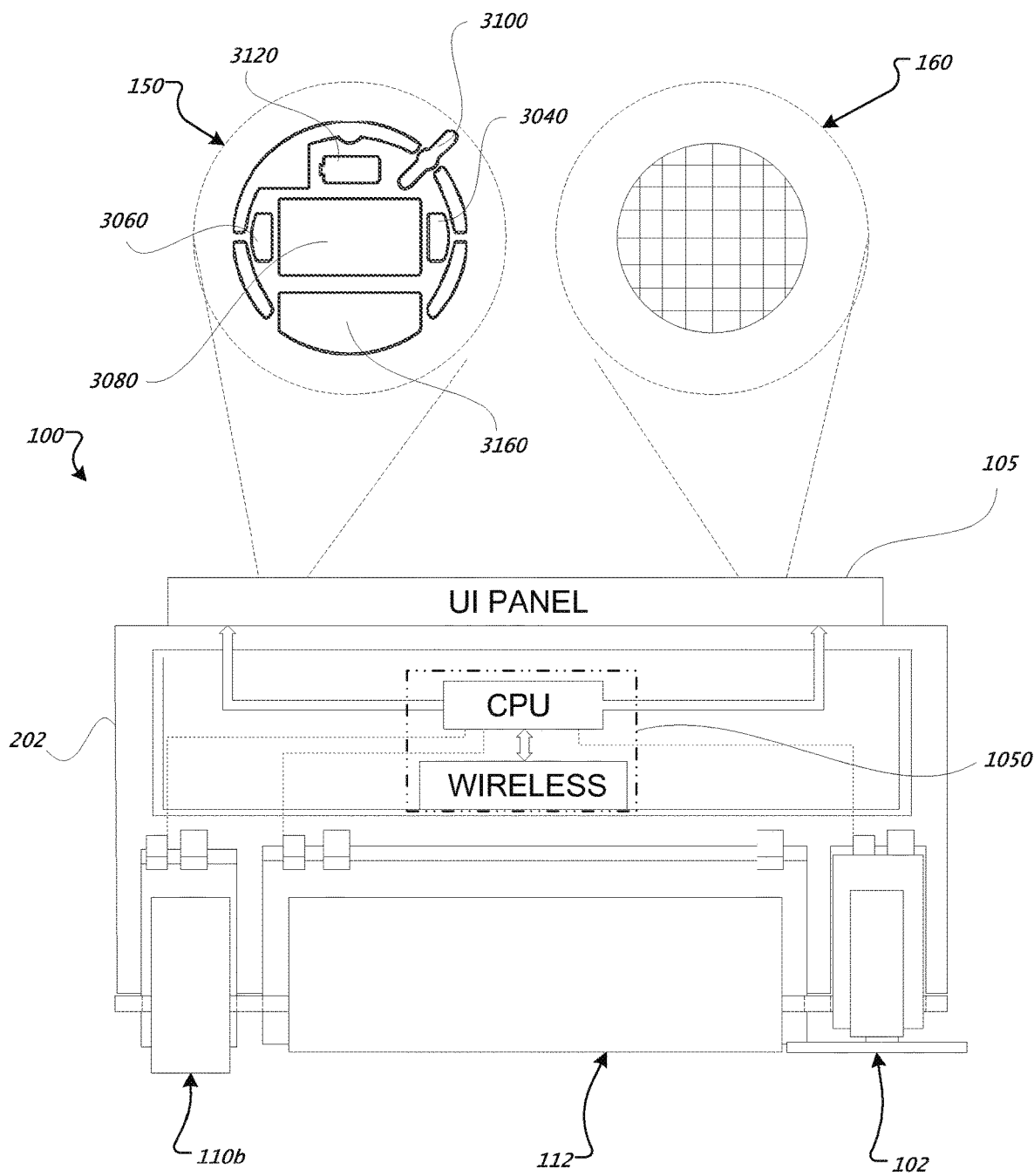
FIG. 15 is a schematic view showing an example of a coverage robot.

FIG. 15 is a schematic view showing an example of a robot 100 including a display panel 105 having indicia 150 and an audio output device 160. The indicia 150 comprises a segmented maintenance display substantially mimicking the appearance of the robot with illuminable indicia 3040, 3060, 3080, 3100, 3120, and 3160 corresponding to each module receptacle 304, 306, 308, 310, 312, and 316, respectively. Module receptacles 304, 306, 308, 310, 312, and 316 correspond to the drive wheel assembly 110*a*, the drive wheel assembly 110*b*, the cleaning assembly 112, the cleaning assembly 102, the electric battery 302, and the cleaning bin 116, respectively. The controller board 1050 controls the illumination of indicia 3040, 3060, 3080, 3100, 3120, and 3160 and the audio responses from the audio output device 160 of the display panel 105 to communicate service needs to a user. In one example, the controller illuminates one or more of the indicia 304, 306, 308, 310, 312, and 316 on the segmented maintenance display panel 105 to indicate that a module in one of the receptacles 304, 306, 308, 310, 312, and 316 needs to be removed and replaced by a user.

The controller board 1050 monitors the currents delivered to the drive wheel assemblies 110*a-b* and the cleaning head assemblies 102 and 112. Upon detecting an over-current, the appropriate indicia 3040, 3060, 3080, and 3100 of the maintenance display 150 is illuminated by the controller board 1050 to indicate a jam or other obstruction to be cleared. In another example, the controller board 1050 sends an audio response which is delivered by the audio output device 160 to provide instructions on how to correct a problem. Once the jam or problem is cleared, a warning/maintenance display will remain illuminated if the over-current remains, indicating that replacement of the module is required. In one implementation, the cleaning bin 116 includes a bin full sensor that communicates a current bin capacity to the controller board 1050. When the controller board 1050 detects that the bin is full it illuminates indicia 3160 to signal to a user to empty the cleaning bin 116. When the controller board 1050 detects that the battery 302 is low or in need of service it illuminates indicia 3120 to signal to a user to maintenance the battery 302. In each example, the controller board 1050 may have guided audio instructions delivered by the audio output device 160. (E.g., remove the cover, remove the module, send it in or discard it, and order a new one.) Different colors (e.g., multi-colored LEDs or different LEDs) may be provided for each segment, in order to communicate different messages—e.g., green for no attention needed, yellow for jam, red for service or maintenance replacement, flashing green for ordinary care such as bin emptying, cleaning fluid replacement, or battery charging).

Figure 16:
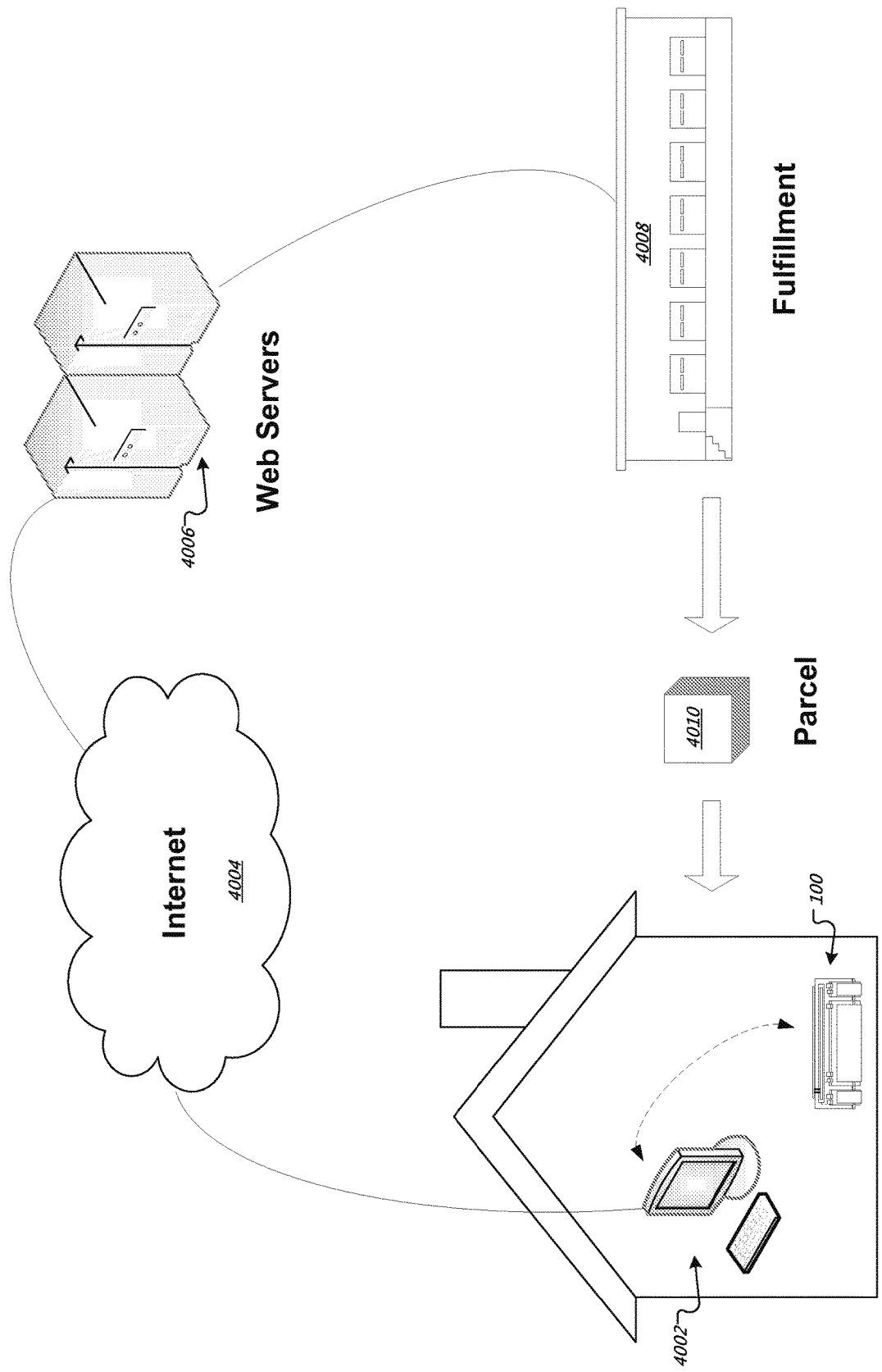
FIG. 16 is a schematic view showing an example of a coverage robot servicing process.

Referring to FIG. 16, modularity is used to extend robot life. In one implementation, a user responds to illumination of the illuminable indicia 3040, 3060, 3080, 3100, 3120, and 3160 on the maintenance display 105 corresponding to one or more modules or to instructions provided from the audio output device 160 to identify a module to be replaced. The user communicates a maintenance request through a computer 4002 over an internet 4004 to a web server 4006 which routes the maintenance request to a fulfillment center 4008. The fulfillment center 4008 sends a replacement part parcel 4010 to the user. The robot 100 can provide audio instructions on how to install the part. In another implementation, the robot 100 communicates wirelessly to a local network 4002, which communicates the maintenance request.

Figure 17:
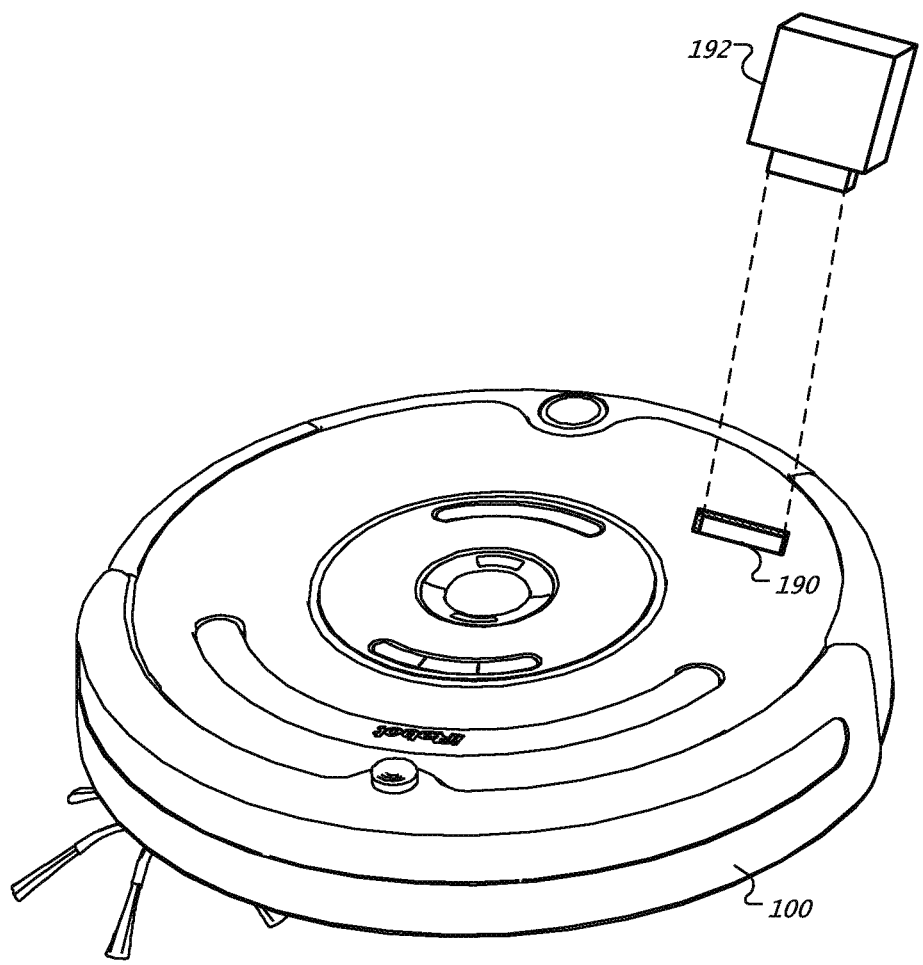
FIG. 17 is a top perspective view showing an example of a coverage robot.

Referring to FIG. 17, the modularity of the robot 100 can be further extended by a module slot 190 defined in an upper portion of the robot 100. The modular slot 190 is configured to accept a data module 192. The data module 192 is self-contained and can transport data on constituent RAM, ROM, Flash, or EEPROM type storage devices (which might be loaded with software, video, or audio content either at a user's computer equipped with a special writing unit or at the manufacturer in order to provide content such as themed content, for example).

In one example, the data module 192 is a recording device installable in the module slot 190 for recording a mileage of the robot 100 and its constituent parts. For example, the data module 192 can record a distance driven, how often the robot 100 has been used, the life of certain modules, when modules have been changed, etc. Furthermore, the robot can be configured to not function without the data module 192 installed. In yet another example, the data module 192 is used to change software behaviors of the robot 100. The cover 106 may form the body of the data module 192, e.g., with additional sensors (e.g., sonar pointing forward, IR emitters/receivers in multiple directions, IR receivers pointing toward compass point directions, IR projectors pointing at the ceiling, IR receivers pointing at the ceiling, gyroscope(s) arranged to detect and/or yaw), actuators (e.g., pan/tilt unit, spray unit), communication (RF or IR line of sight) or microprocessors.

"ROBOT OBSTACLE DETECTION SYSTEM", U.S. Pat. No. 6,594,844, disclosing proximity sensors such as cliff sensors and wall following sensors; "AUTONOMOUS FLOOR-CLEANING ROBOT", U.S. Pat. No. 6,883,201, disclosing a general structure of an iRobot Roomba coverage/cleaning robot and main and edge cleaning heads in detail; "METHOD AND SYSTEM FOR MULTI-MODE COVERAGE FOR AN AUTONOMOUS ROBOT", U.S. Pat. No. 6,809,490, disclosing motion control and coverage behaviors, including escape behaviors, selected by an arbiter according to the principles of behavior based robotics; and "METHOD AND SYSTEM FOR ROBOT LOCALIZATION AND CONFINEMENT", U.S. Pat. No. 6,781,338, disclosing virtual walls, i.e., robot confinement using wall-simulating directed beams, are each incorporated by reference herein in their entireties.

Other robot details and features combinable with those described herein may be found in the following U.S. patent applications filed concurrently herewith, entitled "AUTONOMOUS COVERAGE ROBOT NAVIGATION SYSTEM" having assigned Ser. No. 11/633,869; "COVERAGE ROBOT MOBILITY" having assigned Ser. No. 11/633,885; and "ROBOT SYSTEM" having assigned Ser. No. 11/633,883, the entire contents of the aforementioned applications are hereby incorporated by reference.

A number of implementations have been described. Nevertheless, it will be understood that various modifications may be made without departing from the spirit and scope of the following claims. For example, the coverage robot may include a different number of drive wheel assemblies or cleaning assemblies than those described above. Accordingly, other implementations are within the scope of the following claims.

What is claimed is:
1. A method comprising:
monitoring an operational status of a number of components of a mobile cleaning robot, the components comprising a drive wheel assembly and a cleaning assembly;
determining that the operational status of a particular component does not satisfy a condition; and
providing a notification indicative of the operational status of the particular component based on the determining, wherein the notification comprises an instruction concerning how to (i) remove an obstruction of the particular component, (ii) replace the particular component, or (iii) perform maintenance on the particular component.

2. The method of claim 1, comprising determining a change in the operational status of the particular component.

3. The method of claim 2, wherein determining a change in the operational status of the particular component comprises determining that the operational status of the particular component satisfies the condition.

4. The method of claim 2, comprising providing an updated notification responsive to the change in the operational status of the particular component.

5. The method of claim 1, wherein determining that the operational status of the particular component does not satisfy the condition comprises determining that an electrical current delivered to the particular component is above a threshold.

6. The method of claim 1, wherein determining that the operational status of the particular component does not satisfy the condition comprises determining that the particular component is obstructed or needs replacement.

7. The method of claim 1, wherein providing the notification comprises providing the notification on a display of the mobile cleaning robot.

8. The method of claim 7, wherein providing the notification on the display comprises providing an image on the display representing the particular component of the mobile cleaning robot.

9. The method of claim 7, wherein providing the notification on the display comprises providing an instruction on the display to clear an obstruction of the particular component.

10. The method of claim 7, wherein providing the notification on the display comprises providing information about a location of the particular component.

11. The method of claim 7, wherein providing the notification on the display comprises providing an instruction to remove the particular component from the mobile cleaning robot.

12. The method of claim 7, wherein the display comprises multiple regions, each region representing a respective component of the number of components of the mobile cleaning robot.

13. The method of claim 12, wherein providing the notification comprises illuminating the region of the display that represents the particular component.

14. The method of claim 12, wherein the multiple regions represent the drive wheel assembly, the cleaning assembly, a battery, and a cleaning bin, respectively.

15. The method of claim 1, wherein providing the notification comprises providing an audible notification.

16. The method of claim 15, wherein providing the audible notification comprises providing an audible instruction to remove the particular component from the mobile cleaning robot.

17. The method of claim 1, wherein providing the notification comprises changing a color of an indicator.

18. The method of claim 17, wherein providing the notification comprises changing the color of the indicator to indicate a change in the operational status of the particular component.

19. The method of claim 1, wherein determining that the operational status of the particular component does not satisfy the condition comprises determining that an amount of charge or battery life in a battery of the mobile cleaning robot is below a threshold.

20. The method of claim 1, wherein determining that the operational status of the particular component does not satisfy the condition comprises determining that a fullness of a bin is above a threshold.

* * * * *